US012255029B1

(12) United States Patent
Worsham

(10) Patent No.: US 12,255,029 B1
(45) Date of Patent: Mar. 18, 2025

(54) ROTOR ROTATOR AND ROTOR FOR A MOTORIZED DUAL CIRCUIT, DUAL VOLTAGE-SENSING MULTI-POLE ROTARY BATTERY SWITCH

(71) Applicant: David Worsham, Santa Rosa Beach, FL (US)

(72) Inventor: David Worsham, Santa Rosa Beach, FL (US)

( * ) Notice: Subject to any disclaimer, the term of this patent is extended or adjusted under 35 U.S.C. 154(b) by 342 days.

(21) Appl. No.: 17/956,869

(22) Filed: Sep. 30, 2022

Related U.S. Application Data

(63) Continuation-in-part of application No. 17/189,332, filed on Mar. 2, 2021, now Pat. No. 11,476,064.

(51) Int. Cl.
| | |
|---|---|
| *H01H 19/14* | (2006.01) |
| *H01H 19/04* | (2006.01) |
| *H01H 19/36* | (2006.01) |
| *H01H 47/00* | (2006.01) |
| *H02J 7/00* | (2006.01) |

(52) U.S. Cl.
CPC ............ *H01H 19/14* (2013.01); *H01H 19/04* (2013.01); *H01H 19/36* (2013.01); *H01H 47/002* (2013.01); *H02J 7/007182* (2020.01)

(58) Field of Classification Search
CPC ........ H01H 19/14; H01H 19/04; H01H 19/36; H01H 47/002; H01H 9/20; H01H 3/08; H01H 19/46; H01H 2221/01; H01H 47/00; H02J 7/007182; H02J 7/00
See application file for complete search history.

(56) References Cited

U.S. PATENT DOCUMENTS

| | | | |
|---|---|---|---|
| 7,442,887 B2 | 10/2008 | Graham et al. | |
| 11,476,064 B1 * | 10/2022 | Worsham ............. | H01H 19/563 |

* cited by examiner

*Primary Examiner* — Lheiren Mae A Caroc
(74) *Attorney, Agent, or Firm* — Lanier Ford Shaver & Payne, PC; Gerald M. Walsh

(57) ABSTRACT

A rotor rotator and rotor system for a multi-pole electrical rotary battery switch having a rotor with a top surface and a bottom surface and a key insert opening on the top surface. One or two bus plate connectors are held in chambers on the bottom surface of the rotor. A rotor rotator has a servo motor with a motor gear in the rotor rotator, a switch nob connector at a top end of the rotor rotator, and a rotor key shaft at a bottom end of the rotor rotator which inserts into the key insert opening of the rotor. A programmable printed circuit board with a processor and memory are positioned around the rotor rotator and provide electrical current to the servo motor. Electrical connector poles provide electrical current to the printed circuit board by means of electrical conducting springs. The switch operates both automatically and manually.

13 Claims, 20 Drawing Sheets

ROTOR ROTATOR AND ROTOR FOR A MOTORIZED DUAL CIRCUIT, DUAL VOLTAGE-SENSING MULTI-POLE ROTARY BATTERY SWITCH

CROSS REFERENCE TO RELATED APPLICATION

This application is a continuation-in-part of and claims priority to U.S. patent application Ser. No. 17/189,332, filed Mar. 2, 2021, now U.S. Pat. No. 11,476,064, the disclosures of which is are incorporated by reference herein in their entirety.

FIELD OF THE INVENTION

The present invention is related to electrical switches and, more particularly, to a rotor rotator and rotor for multi-pole rotary battery electrical switches that are motorized, automatic, and remote controlled, wherein a single multipole rotary battery switch operates a two-battery system as well as a motor in the rotor rotator.

BACKGROUND OF THE INVENTION

Electrical switches are useful in providing electrical power to a plurality of pathways from energy sources, such as batteries, to various electrically driven devices. U.S. Pat. No. 7,442,887 discloses a rotary electrical switch for simultaneously turning on or turning off two distinctly separate and isolated electrical circuits and providing a second option of connecting the two separate circuits together. This is accomplished with a rotor keyed with an external knob used to control rotational position of the rotor. The rotor has two electrically conductive link bars that electrically couple with two or four of the stationary bus bars, dependent upon a rotational position of the rotor. Each bus bar is electrically connected to an electrical terminal. However, when the external knob is in an "OFF" position the link bars still make electrical contact with two of the stationary bus bars. A safer configuration would be to have the link bars make no contact with the bus bars in an "OFF" position of the external knob. In addition, motorized versions of two-pole battery switches require a switch for each battery which requires multiple switches and complex wiring and installation. A single rotary battery switch is preferred in view of its simplicity and relatively low cost.

SUMMARY OF THE INVENTION

The present invention provides is rotor rotator and rotor system for a multi-pole electrical rotary switch with a rotor having a top surface and a bottom surface with a key insert opening on the top surface with one or two bus plate connectors held in chambers on the bottom surface of the rotor. The rotor is rotated with a rotor rotator using a servo motor with a motor gear, positioned in a middle portion of the rotor rotator. A switch nob connector is positioned at a top end of the rotor rotator and a rotor key shaft is positioned at a bottom end of the roto rotator. The rotor key shaft inserts into the key insert opening of the rotor which allows the rotor rotator to rotate the rotor.

The rotor rotator is positioned in a switch cover, the switch cover having an inner gear engaging the motor gear, allowing the motor gear to rotate the rotor rotator. A programmable printed circuit board with a processor and memory is positioned around the rotor rotator and provides electrical current to the servo motor. The two to four bus plates connect to two to four electrical connector poles. The two to four electrical connector poles provide electrical current to the printed circuit board by means of electrical conducting springs connected to the electrical connector poles and to the printed circuit board. The electrical conducting springs detect voltage changes for a voltage sensitive relay in the printed circuit board, forming a voltage sensitive relay battery charger. The rotor connects a first pair of electrical connecting poles to a first battery and connects a second pair of electrical conducting poles to a second battery or connects both pairs of electrical conducting poles to each other, by rotation of the rotor rotator.

A remote controller is connected electrically to the printed circuit board to operate the rotor rotator remotely in the automatic mode. The multi-pole electrical rotary switch is in an automatic mode when the motor gear engages the inner gear and the printed circuit board rotates the rotor rotator automatically by action of the processor. The multi-pole electrical rotary switch is in a manual mode when the rotor rotator is pushed downward, disengaging the motor gear from the inner gear, and the rotor rotator is rotated manually.

Retainers in the chambers may be constructed to engage sides of the one or two bus plate connectors, wherein the retainers are constructed to prevent the one or two bus plate connectors from dropping out of the chambers when the bus plate connectors are placed above two to four bus plates in a bus plate holder to place the multi-pole rotary electrical switch in an "OFF" position.

An advantage of the present invention is single rotary battery switch that operates two separate battery systems and a motor that automates the switch.

Another advantage is a single rotary battery switch that allows two battery systems to operate separately or in combination.

Another advantage is a reduction in cost of manufacture and of installation due to the requirement of only one rotary battery switch and one voltage sensitive relay to operate two battery systems.

BRIEF DESCRIPTION OF THE DRAWINGS

FIG. 28B shows the configuration of the bus plate connectors on the bus plates when the switch is on.

DETAILED DESCRIPTION OF THE INVENTION

While the following description details the preferred embodiments of the present invention, it is to be understood that the invention is not limited in its application to the details of arrangement of the parts or steps of the methods illustrated in the accompanying figures, since the invention is capable of other embodiments and of being practiced in various ways.

Figure 1:
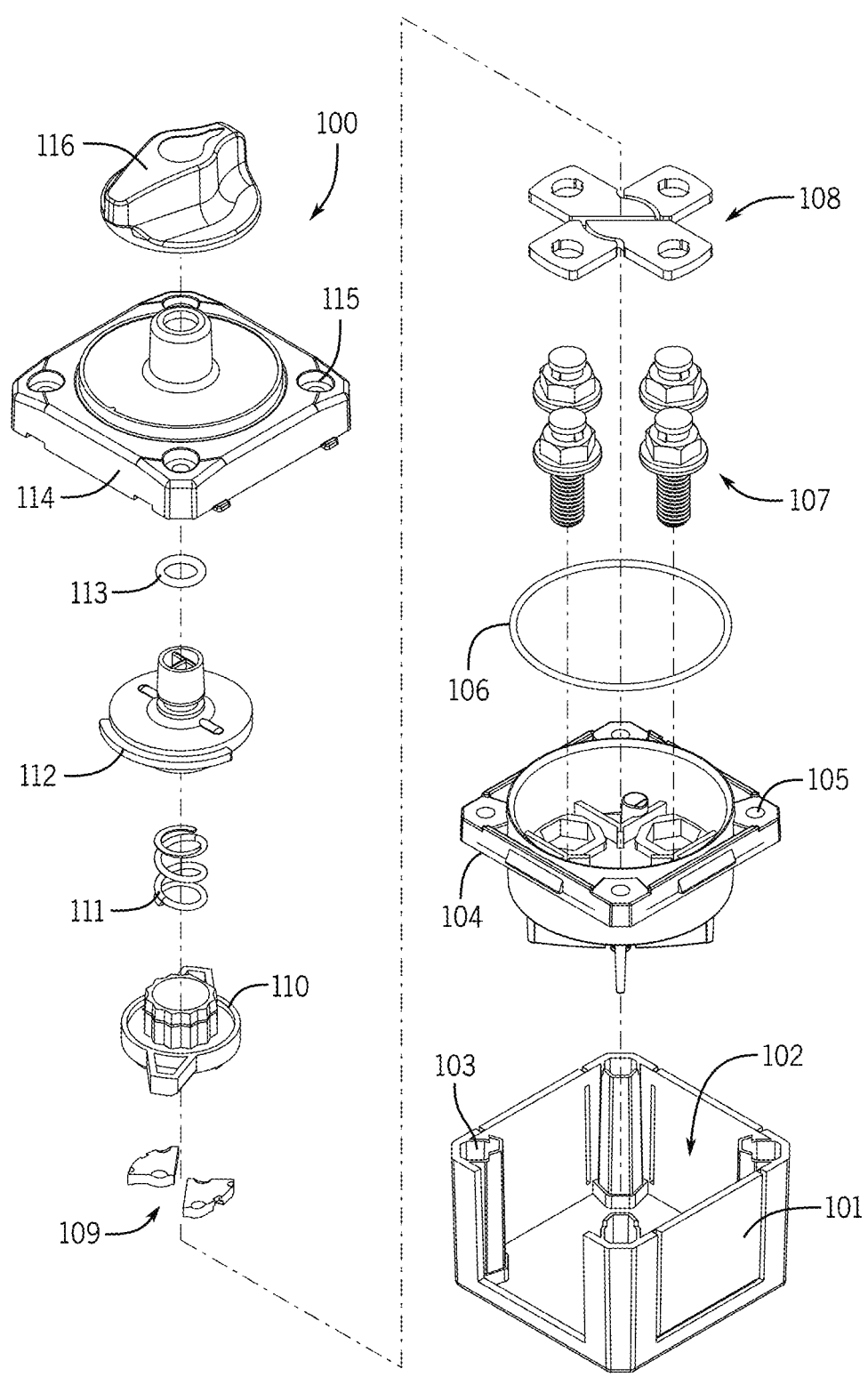
FIG. 1 shows an exploded view of the rotary switch of the present invention.
Figure 2:
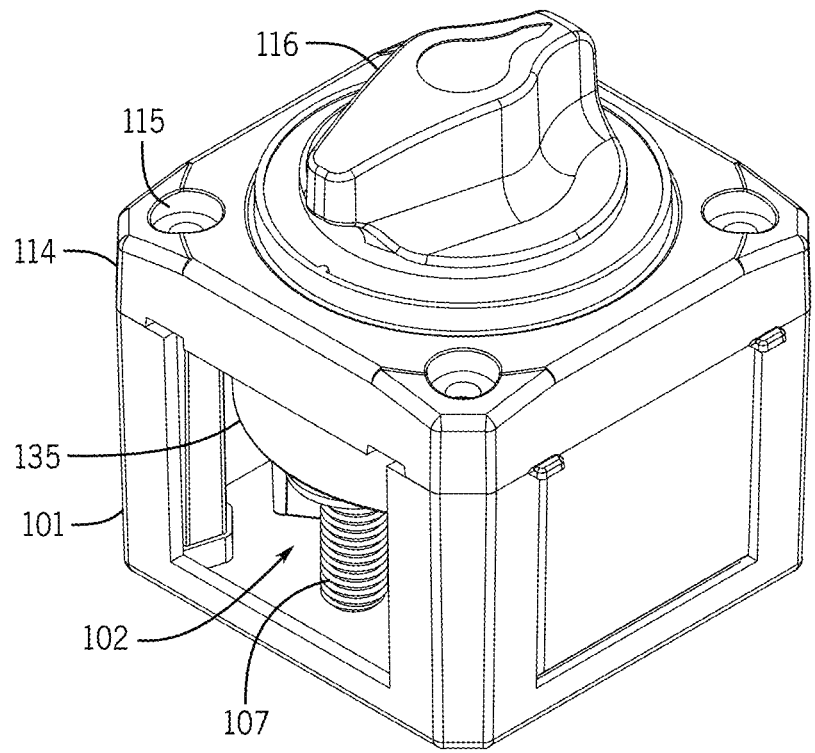
FIG. 2 shows a top, front, right side perspective view of the rotary switch.

FIG. 1 shows an exploded view of the rotary switch 100 of the present invention. The rotary switch 100 has a housing 101, an interior 102, and bolt holes 103. A bus plate holder 104 fits in the interior 102 of the housing and has bolt holes 105. The rotary switch 100 has a large O-ring seal 106, electrical terminals 107, bus plates 108, bus plate connectors 109, and a keyed bus plate connector rotor 110. The rotor 110 is inserted into a rotor rotator 112 with a spring 111. The rotor rotator 112 has an O-ring seal 113 and fits in a cover 114 of the housing 101. The cover 114 also has a knob 116 and bolt holes 115. The large O-ring 106 fits into the cover 114. FIG. 2 shows the rotary switch 100 in an assembled configuration, further showing a bottom end 135 of the bus plate holder 104 extending into the interior 102 of the housing 101.

Figure 3:
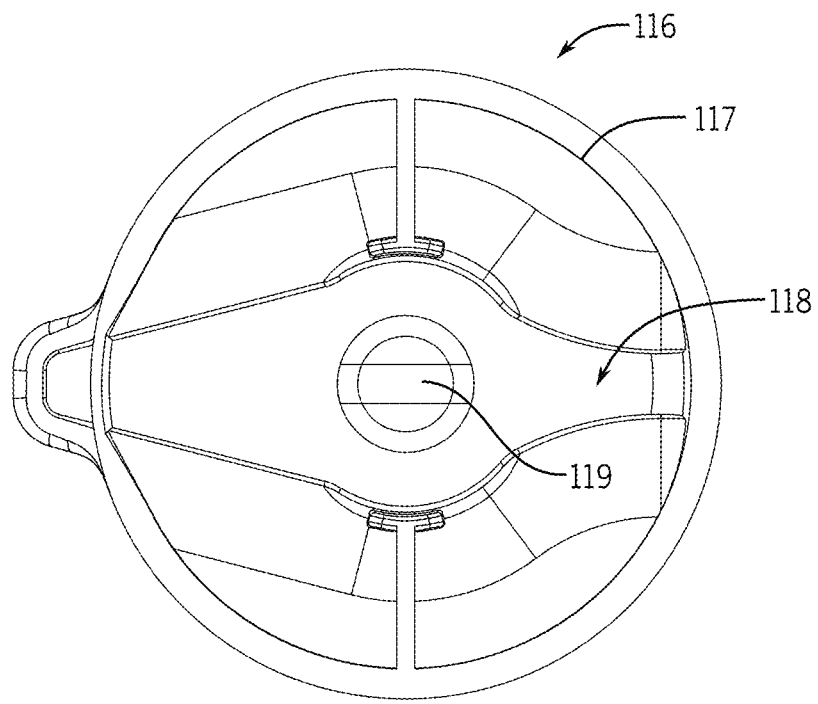
FIG. 3 shows a bottom perspective view a rotary control knob used to place the switch in a first (OFF) position (no electrical terminals connected to each other), a second position (a first and third electrical terminal electrically connected to each other and a second and fourth electrical terminal connected to each other), and in a third position (all four electrical terminals connected to each other).
Figure 4:
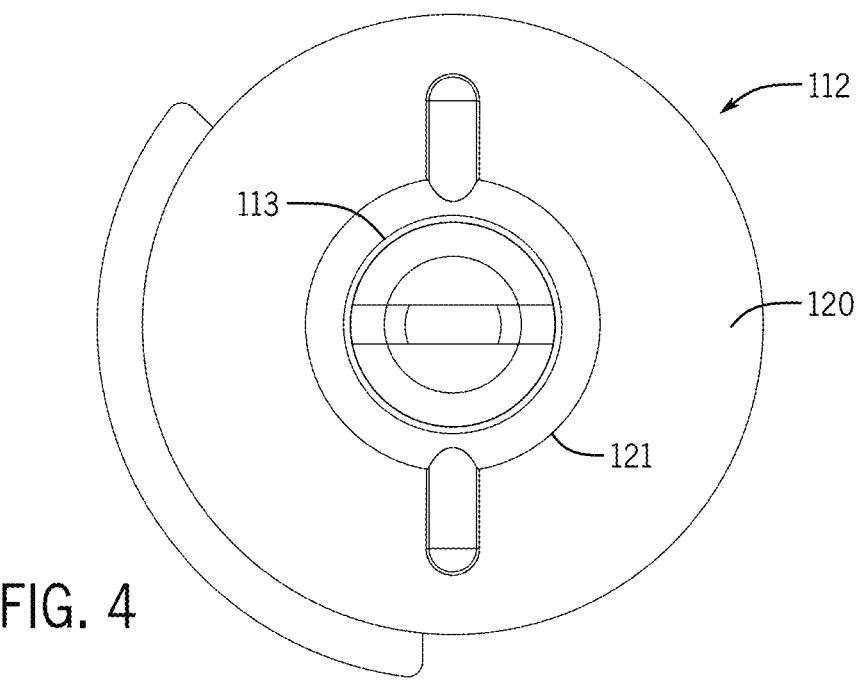
FIG. 4 shows a top perspective view of a rotor rotator.

FIG. 3 shows a bottom perspective view the rotary control knob 116 used to place the switch in a first (OFF) position (no electrical terminals connected to each other), a second position (a first and third electrical terminal electrically connected to each other and a second and fourth electrical terminal connected to each other), and in a third position (all four electrical terminals connected to each other). The bottom end 117 of knob 116 has an interior 118 with a keyed member 119 therein. FIG. 4 shows a top perspective view of the rotor rotator 112. The rotator rotor 112 has a lock member 121 on the top end 120 of the rotor rotator 112. The keyed member 119 of knob 116 fits into the lock member 121 of rotor rotator 112 so that when the knob 116 is rotated the rotor rotator 112 rotates in unison with the knob 116.

Figure 5:
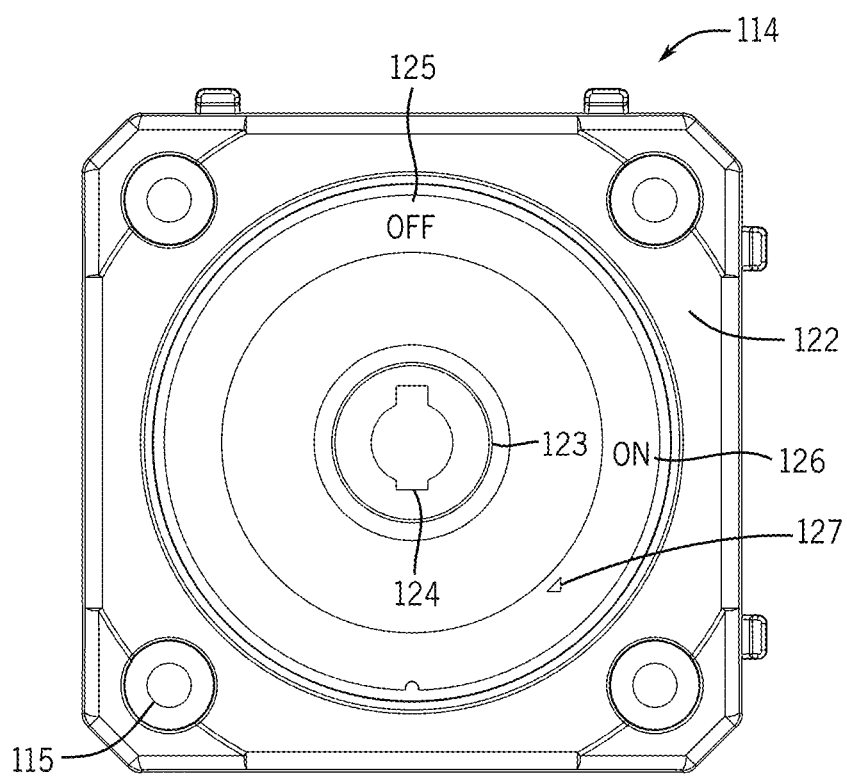
FIG. 5 shows a top view of a cover of a housing of the rotary switch.
Figure 6:
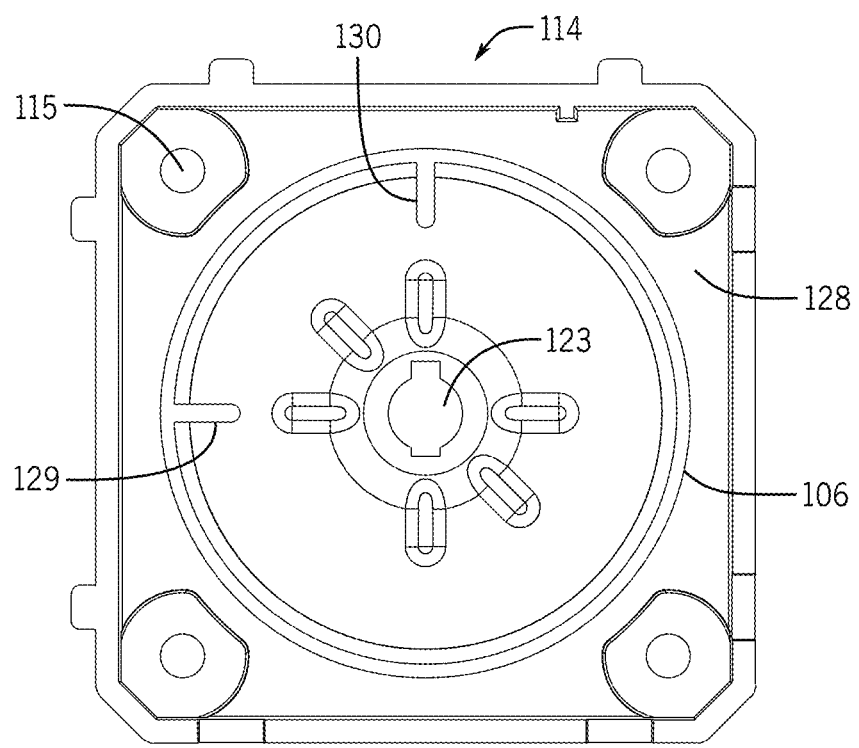
FIG. 6 shows a bottom view of the cover of the housing.
Figure 7A:
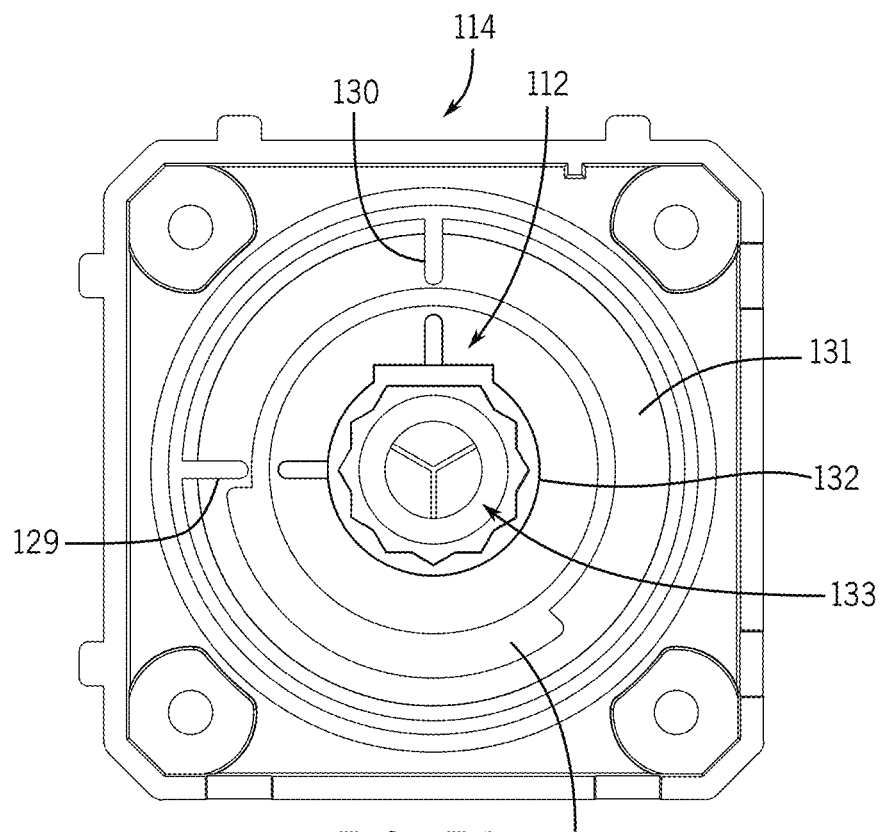
FIG. 7A shows a bottom view of the cover of the housing with a rotor rotator positioned on the bottom side of the cover in a first "OFF" position.
Figure 7B:
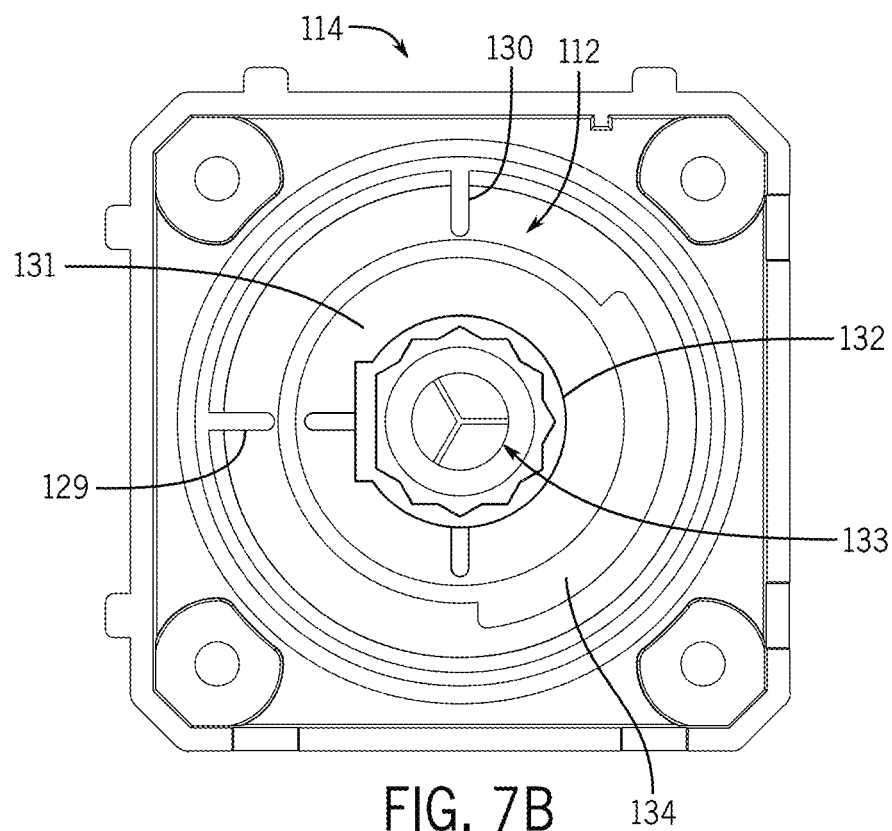
FIG. 7B shows the view of FIG. 7A with the rotor rotator in a second "ON" position.
Figure 7C:
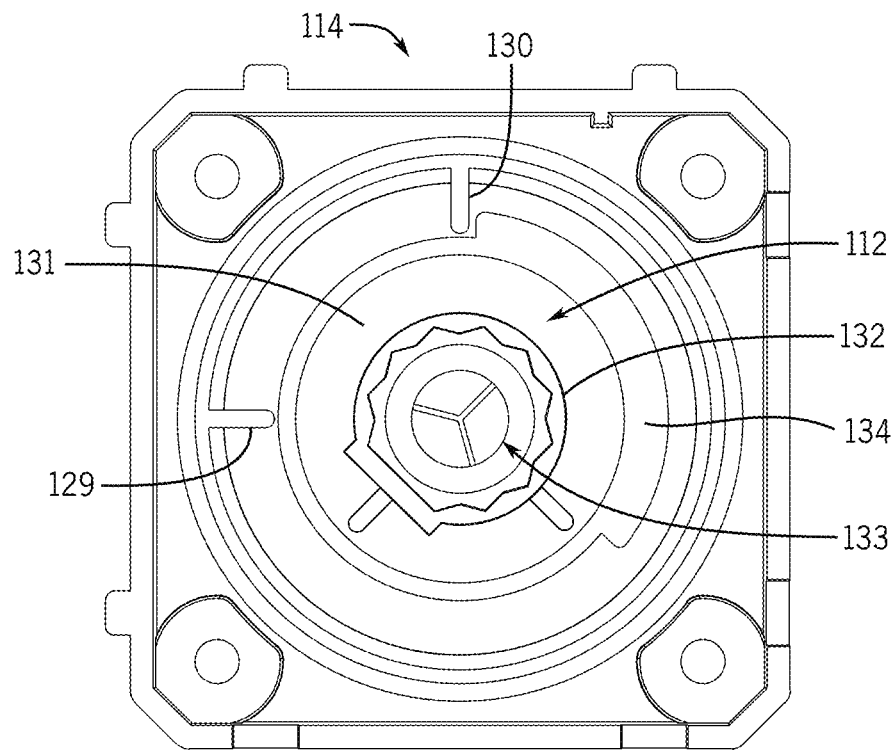
FIG. 7C shows the view of FIG. 7A with the rotor rotator in a third "ON" position.
Figure 8:
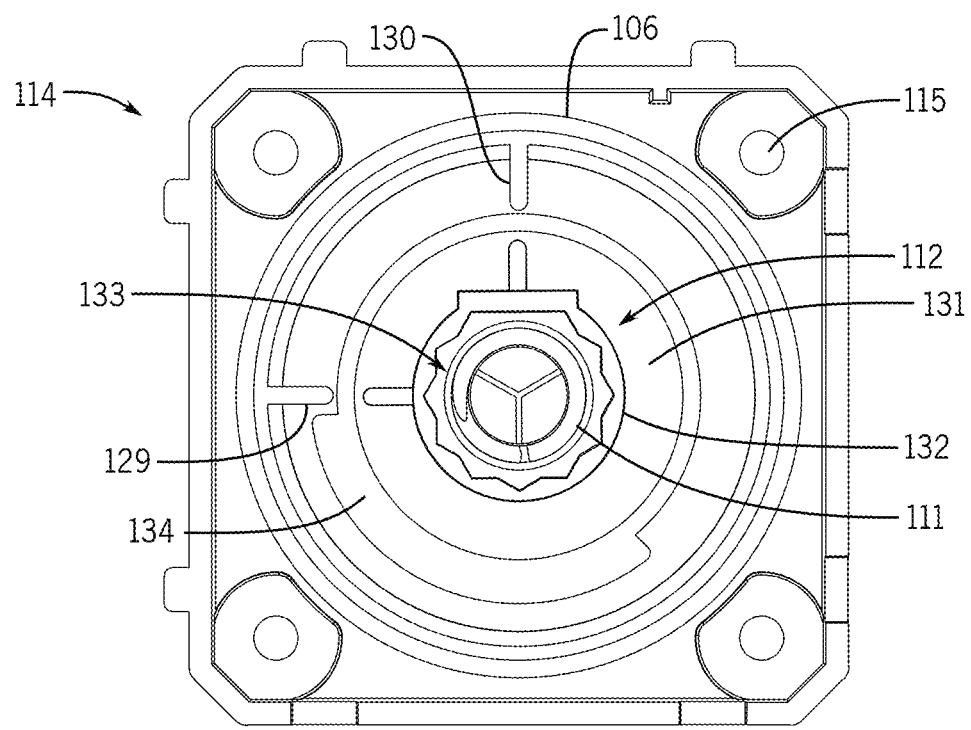
FIG. 8 shows an enlarged view of FIG. 7A with a spring in an interior of the rotor rotator.

FIG. 5 shows a top view of a cover 114 of the housing 101 of the rotary switch 100. The cover 114 has a top surface 122 and a mounting member 123 having a keyed opening 124. Cover 114 shows first position 125 which is an "OFF" position of the switch, a second "ON" position 126, and a third "ON" position 127. FIG. 6 shows a bottom view of the cover 114. A bottom side 128 of the cover 114 has a first stop member 129 and a second stop member 130. The large O-ring seal 106 is shown positioned on the bottom side 128 of the cover 114. FIG. 7A shows a bottom view of the cover 114 with a rotor rotator 112 positioned on the bottom side 128 of the cover in the first "OFF" position 125. A bottom surface 131 of the rotor rotator 112 has a lock housing 132 having an interior 133. A perimeter of the rotor rotator 112 has a flange member 134. A first end of the flange member 134 engages the first stop member 129. FIG. 7B shows the view of FIG. 7A with the rotor rotator 112 in the second position 126. FIG. 7C shows the view of FIG. 7A with the rotor rotator 112 in the third position 127. The second opposite end of the flange member 134 engages the second stop member 130. FIG. 8 shows an enlarged view of FIG. 7A with a spring 111 in the interior 133 of the lock housing 132.

Figure 9:
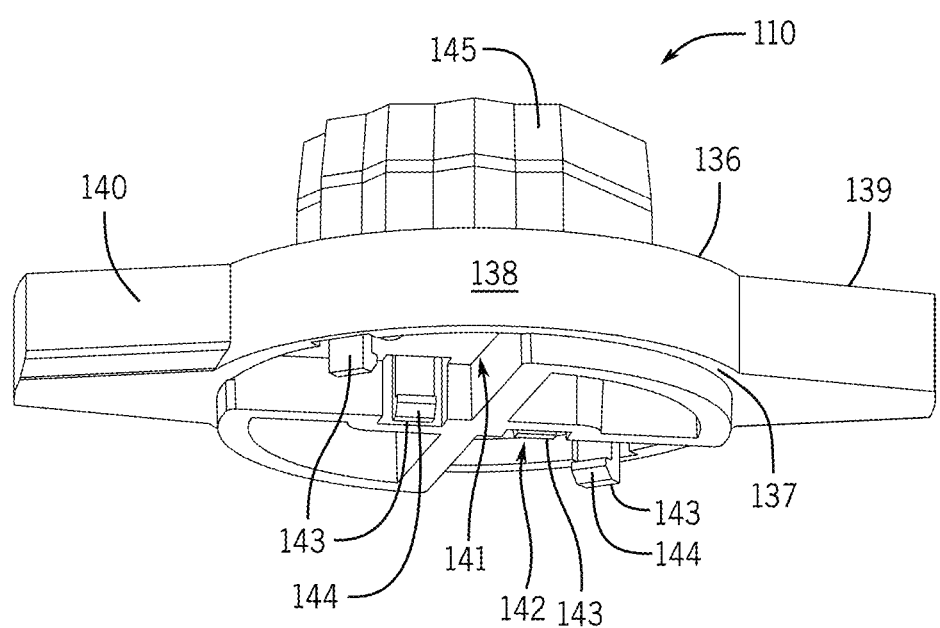
FIG. 9 shows a bottom, side perspective view of a rotor.
Figure 10:
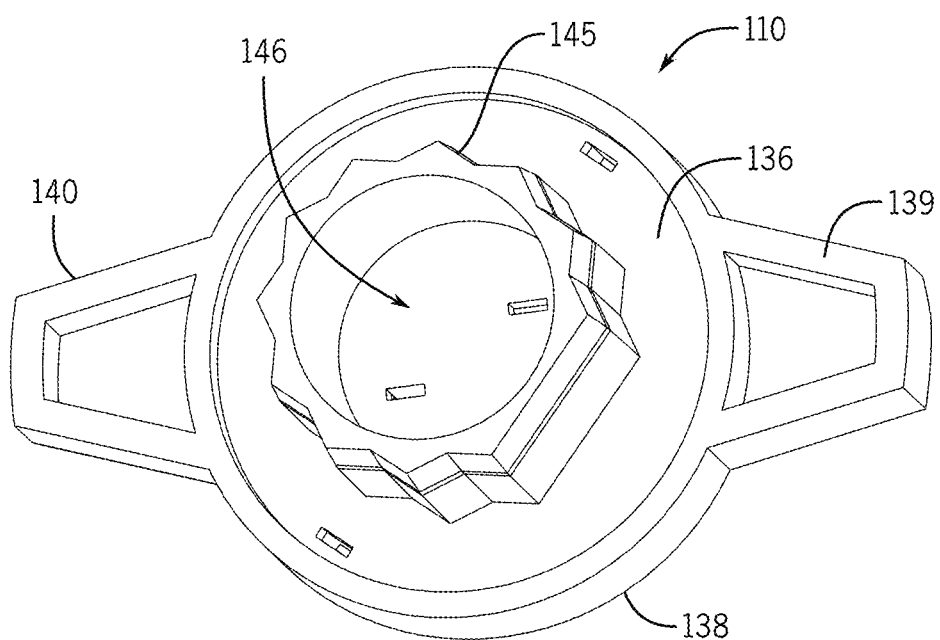
FIG. 10 shows a top perspective view of the rotor.
Figure 11:
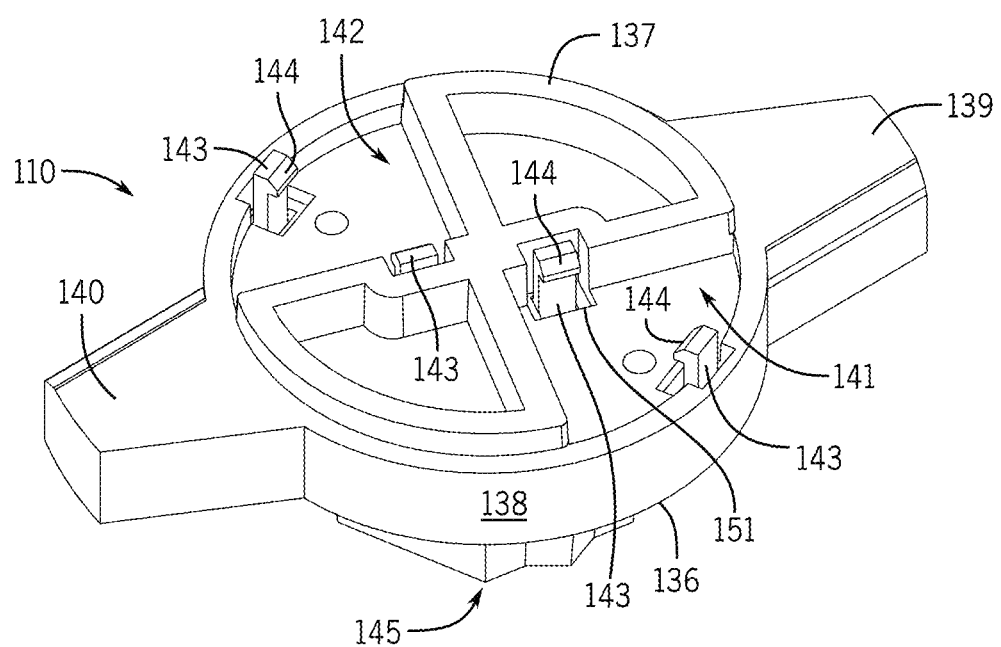
FIG. 11 shows a bottom perspective view of the rotor.

FIG. 9 shows a bottom, side perspective view of a rotor 110. The rotor 110 has a top surface 136, a bottom surface 137, and sides 138. Extending from a side 138 is a first support member 139 and a second support member 140. On the bottom surface 137 is a first bus plate connector chamber 141 and a second bus plate connector chamber 142, each chamber having flexible retainers 143 for the bus plate connectors 109. Each retainer 143 has a lip member 144. On the top surface 136 is a keyed member 145. FIG. 10 shows a top perspective view of the rotor 110. The keyed member 145 has an interior 146. The spring 111 fits in the interior 146 of the keyed member 145, and the keyed member 145 fits into the interior 133 of the lock housing 132 on the bottom 131 of the rotor rotator 112. FIG. 11 shows a bottom perspective view of the rotor 110 in greater detail.

Figure 12:
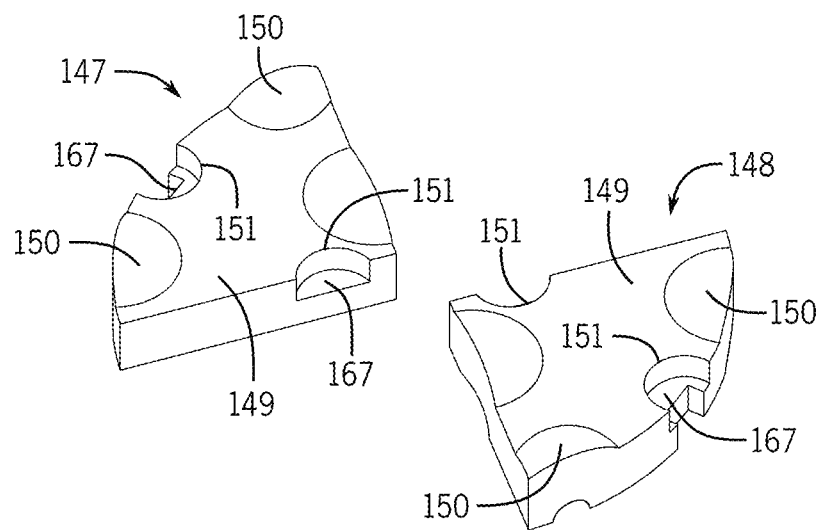
FIG. 12 shows a bottom perspective view of bus plate connectors that are shaped to fit in the rotor.
Figure 13:
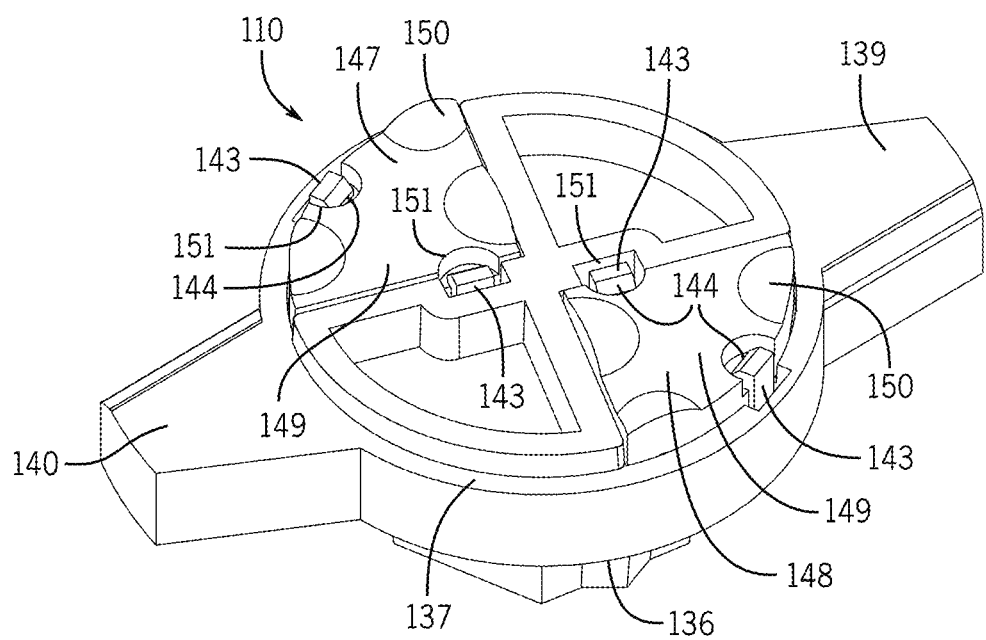
FIG. 13 shows a bottom perspective view of the rotor with the bus plate connectors retained in the rotor.

FIG. 12 shows a bottom perspective view of a first bus plate connector 147 and a second bus plate connector 148 that are shaped to fit in the bus plate connector chambers 141 and 142 of rotor 110. The bottom surfaces 149 of the bus plate connectors 147 and 148 have protrusions 150 for facilitating electrical contact. Sides of the bus plate connectors 147 and 148 have receptacles 151. Receptacles 151 have a ledge 167 which is engaged by the lip members 144 on retainers 143. FIG. 13 shows a bottom perspective view of the rotor 110 with the bus plate connectors 147 and 148 retained in the rotor 110. The lip members 144 extend into the receptacles 151, fit over the ledges 167, and reversibly retain the bus plate connectors 147 and 148 in the chambers 141 and 142. The bus plate connectors 147 and 148 are not able to drop out of the chambers 141 and 142 because the lip members 144 hold the bus plate connectors 147 and 148 in the chambers 141 and 142 in any orientation of the rotor 110. The lip members 144 may be beveled to facilitate pressing the bus plate connectors 147 and 148 into the chambers 141 and 142.

Figure 14:
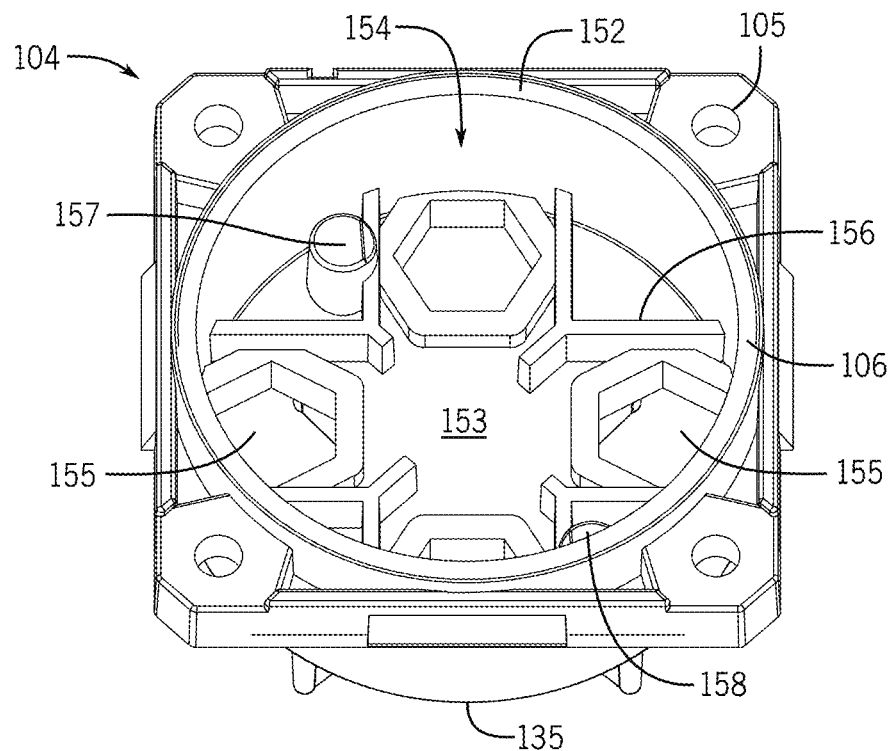
FIG. 14 shows a top perspective view of a bus plate holder having support posts for mounting support members of the rotor.

FIG. 14 shows a top perspective view of the bus plate holder 104. Bus plate holder 104 as a top surface 152 and a bottom surface 153 defining an interior 154. The bottom surface 153 has openings 155 for insertion of electrical terminals 107 and has support structures 156 for bus plates 108. The bottom surface 153 has a first support post 157 and a second support post 158 for supporting the first support member 139 and the second support member 140, respectively, of the rotor 110 when the rotor 110 is in the first (OFF) position (see FIG. 17).

Figure 15:
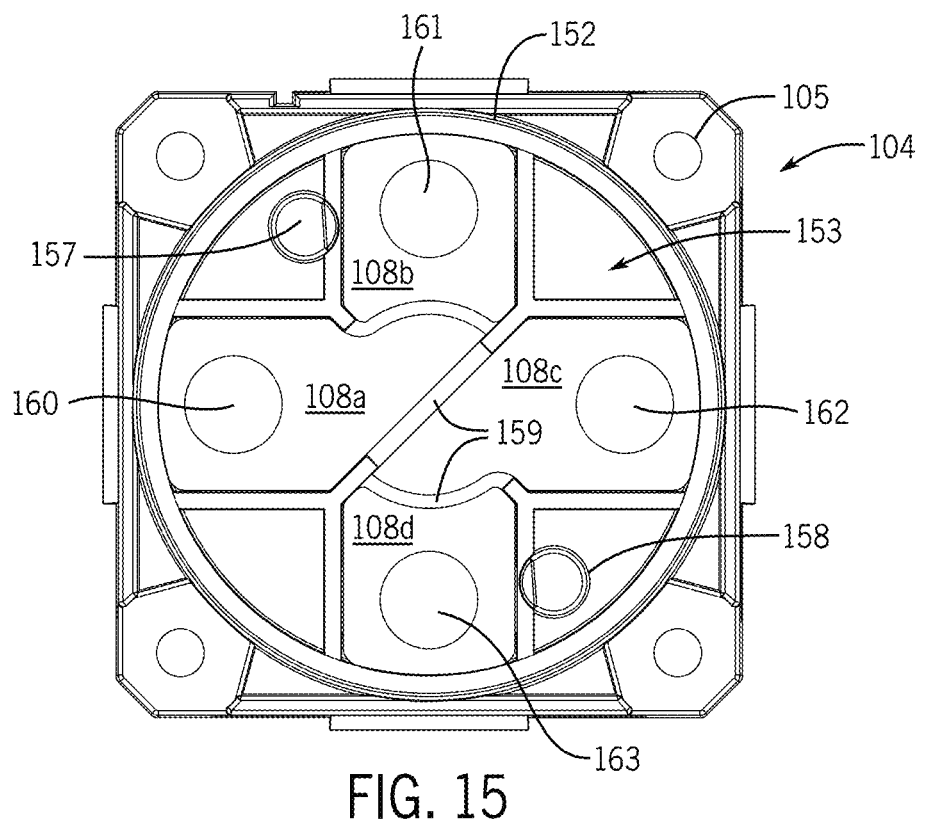
FIG. 15 shows a top perspective view of the bus plate holder with four bus plates, each attached electrically to an electrical terminal.

FIG. 15 shows a top perspective view of the bus plate holder 104 with four bus plates, each attached electrically to an electrical terminal. A first bus plate 108a is attached to a first electrical terminal 160. A second plate 108b is attached to a second electrical terminal 161. A third bus plate 108c is attached to a third electrical terminal 162. A fourth bus plate 108d is attached to a fourth electrical terminal 163. There is a gap 159 between the bus plates so that the bus plates do not make electrical contact with each other.

Figure 16A:
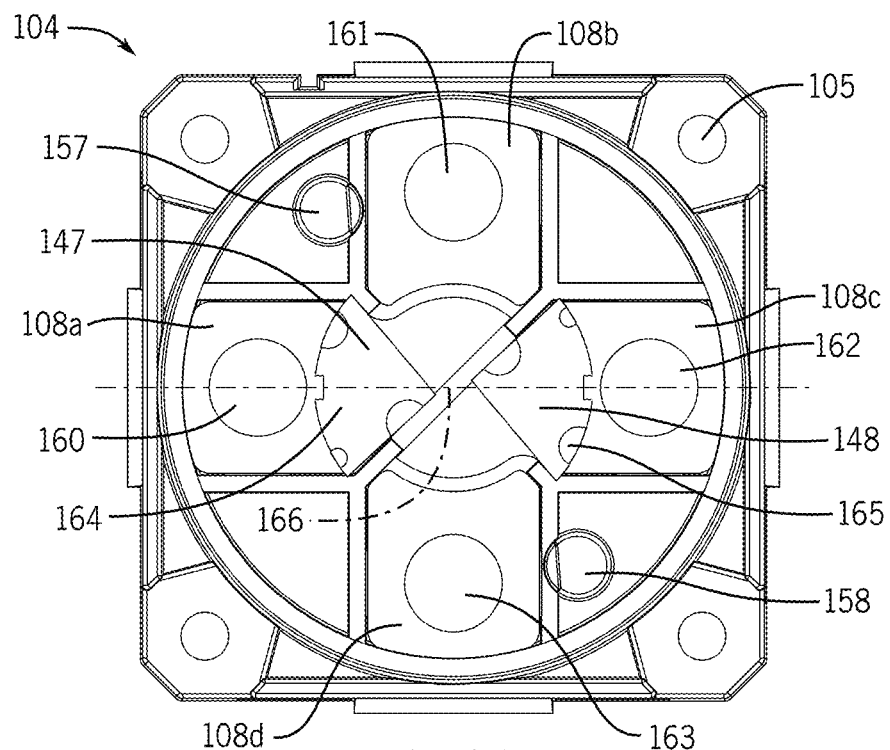
FIG. 16A shows the view of FIG. 15, illustrating the location of a first bus plate connector over a first bus plate and a second bus plate connector over a third bus plate when the rotary switch is in a first "OFF" position, wherein the bus plate connectors are not making electrical contact with the bus plates.

FIG. 16A shows the view of FIG. 15, illustrating the location of the first bus plate connector 147 over the first bus plate 108a and the second bus plate connector 148 over the third bus plate 108c when the rotary switch 100 is in the first "OFF" position 125. In this configuration, the bus plate connectors 147 and 148 do not make electrical contact with the bus plates 108a and 108c because they are lifted up and off the bus plates 108a and 108c by the first support member 139 and the second support member 140 of the rotor 110 being rotated upon the first support post 157 and the second support post 158, respectively (see FIGS. 17 and 18).

Figure 16B:
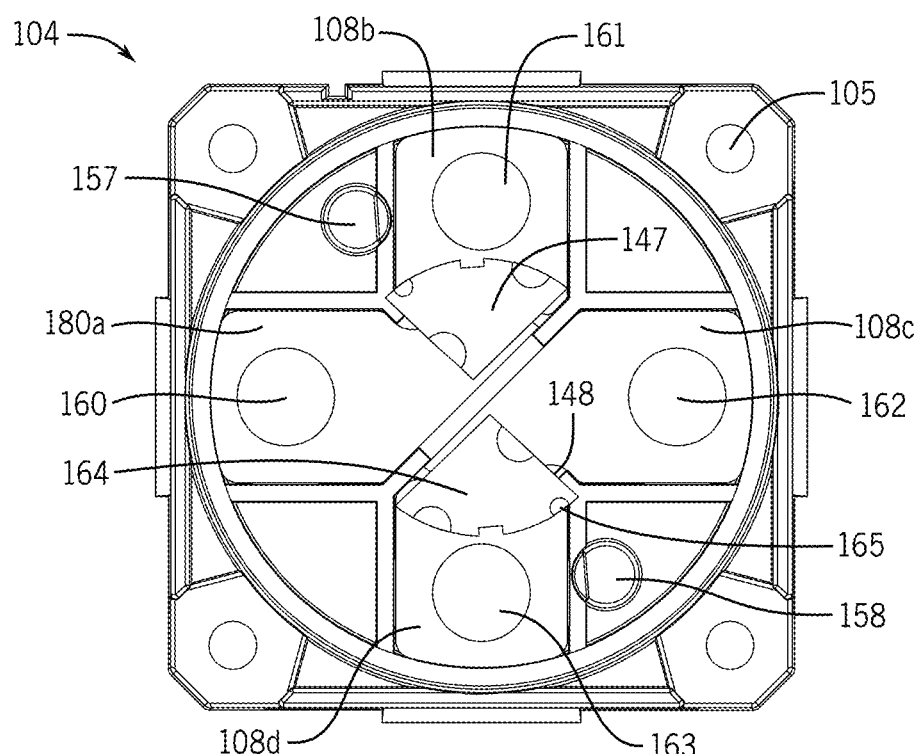
FIG. 16B shows the view of FIG. 15, illustrating the location of a first bus plate connector on a first and a second bus plate and a second bus plate connector on a third and fourth bus plate when the rotary switch is in the second position, wherein the bus plate connectors are making electrical contact with the bus plates.

FIG. 16B shows the view of FIG. 15, illustrating the location of the first bus plate connector 147 on the first bus plate 108a and on the second bus plate 108b and the second bus plate connector 148 on the third bus plate 108c and on the fourth bus plate 108d when the rotary switch 100 is in the second position 126. In this configuration, the first support member 139 and second support member 140 of the rotor 110 are rotated off the first support post 157 and the second support post 158. The spring 111 in the interior 146 of rotor 111 biases (pushes) the rotor 111 downward, thereby pushing the first bus plate connector 147 and the second plus plate connector 148 onto the bus plates, thereby electrically connecting the first bus plate 108a to the second bus plate 108b and electrically connecting the third bus plate 108c to the fourth bus plate 108d. Consequently, the first electrical terminal 160 is connected electrically to the second electrical terminal 161 and the third electrical terminal 162 is connected electrically to the 4th electrical terminal 163.

Figure 16C:
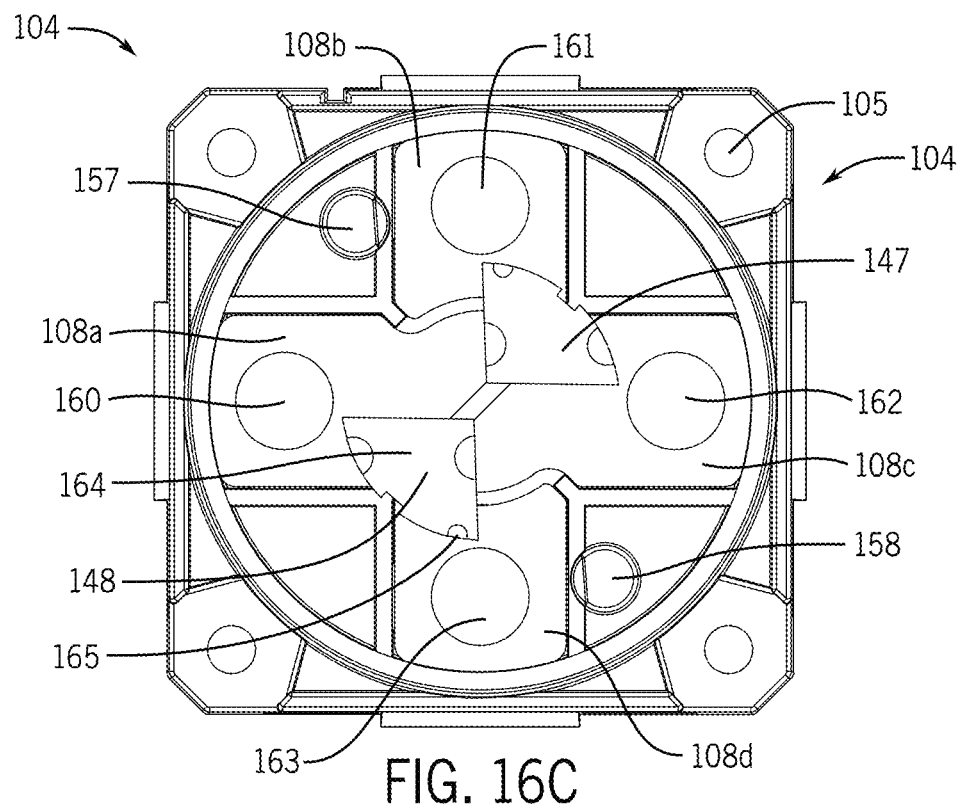
FIG. 16C shows the view of FIG. 15, illustrating the location of a first bus plate connector on a first, second, and third bus plate and a second bus plate connector on a third and fourth and first bus plate when the rotary switch is in the third position, wherein the bus plate connectors are making electrical contact with the bus plates.

FIG. 16C shows the view of FIG. 15, illustrating the location of the first bus plate connector on the first, second, and third bus plates and the second bus plate connector on the third and fourth and first bus plates when the rotary switch is in the third position 127. In this configuration, the support members 139 and 140 of the rotor 110 are still off the support posts 157 and 158. The first bus plate connector 147 is connected to the first bus plate 108a, the second bus plate 108b, and the third bus plate 108c. The second bus plate connector 148 is connected to the third base plate 108c, the fourth bus plate 108d, and the first bus plate 108a. Thus, all the bus plates 108a-108d are electrically connected to each other and all the electrical terminals 160-163 are electrically connected together. When the rotor 110 is rotated back to the first position 125 the support members 139 and 140 are rotated back up onto the support posts 157 and 158 where the bus plate connectors 147 and 148 are lifted up off the bus plates. The bus plate connectors 147 and 148, thus, do not make any electrical connection with the bus plates when the switch 100 is in the off position 125.

Figure 17:
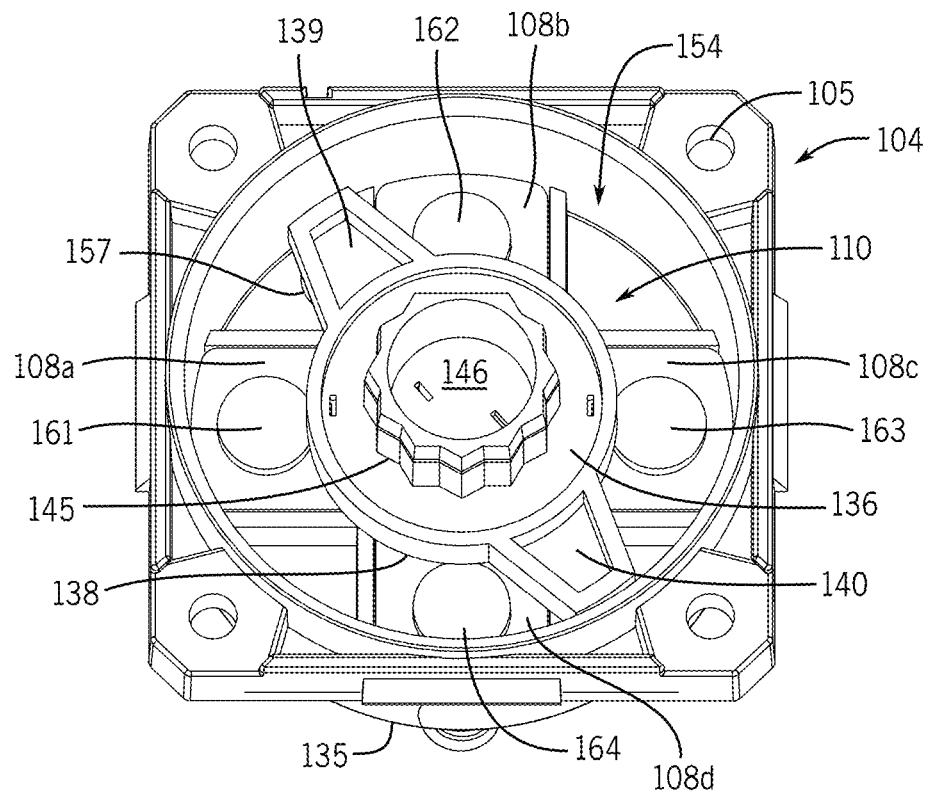
FIG. 17 shows the view of FIG. 15 with the rotor positioned in the interior of the bus plate holder in the first (OFF) position, wherein the support members of the rotor are mounted on the support posts in the bus plate holder.

FIG. 17 shows the view of FIG. 15 with the rotor 110 positioned in the interior 154 of the bus plate holder 104 in the first (OFF) position 125. The support members 139 and 140 of the rotor 110 are shown mounted onto the support posts 157 and 158.

Figure 18:
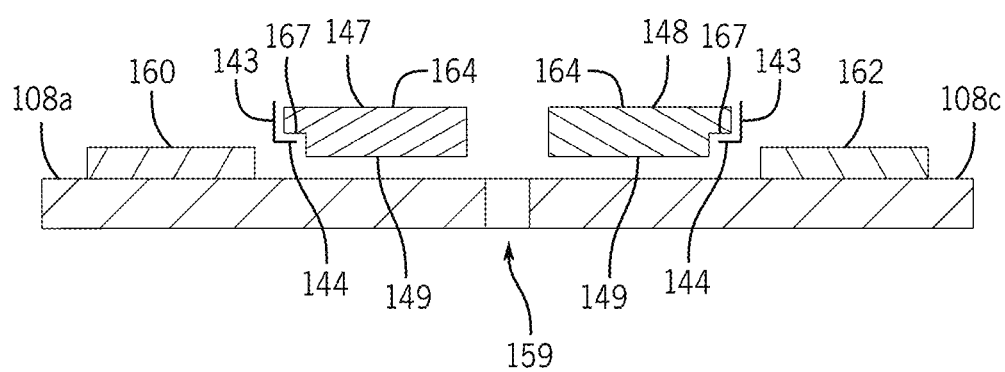
FIG. 18 is a sectional view diagram along the dashed line shown in FIG. 16A, illustrating the bus connecting plates suspended above the bus plates, making no electrical connection with the bus plates, when the rotary switch is in the first (OFF) position.

FIG. 18 is a sectional view diagram along the dashed line 166 shown in FIG. 16A, illustrating the bus plate connectors 147 and 148 suspended above the bus plates 108a and 108c making no electrical connection with the bus plates, when the rotary switch is in the first (OFF) position. Lip members 144 on retainers 143 are shown holding the bus plates 147 and 148 in place above the bus plates 108a and 108c. The distance between the bus plate connectors 147 and 148 and the bus plates 108a and 108c is between 1.0-0.25 mm, preferably, 0.45 mm.

Figure 19:
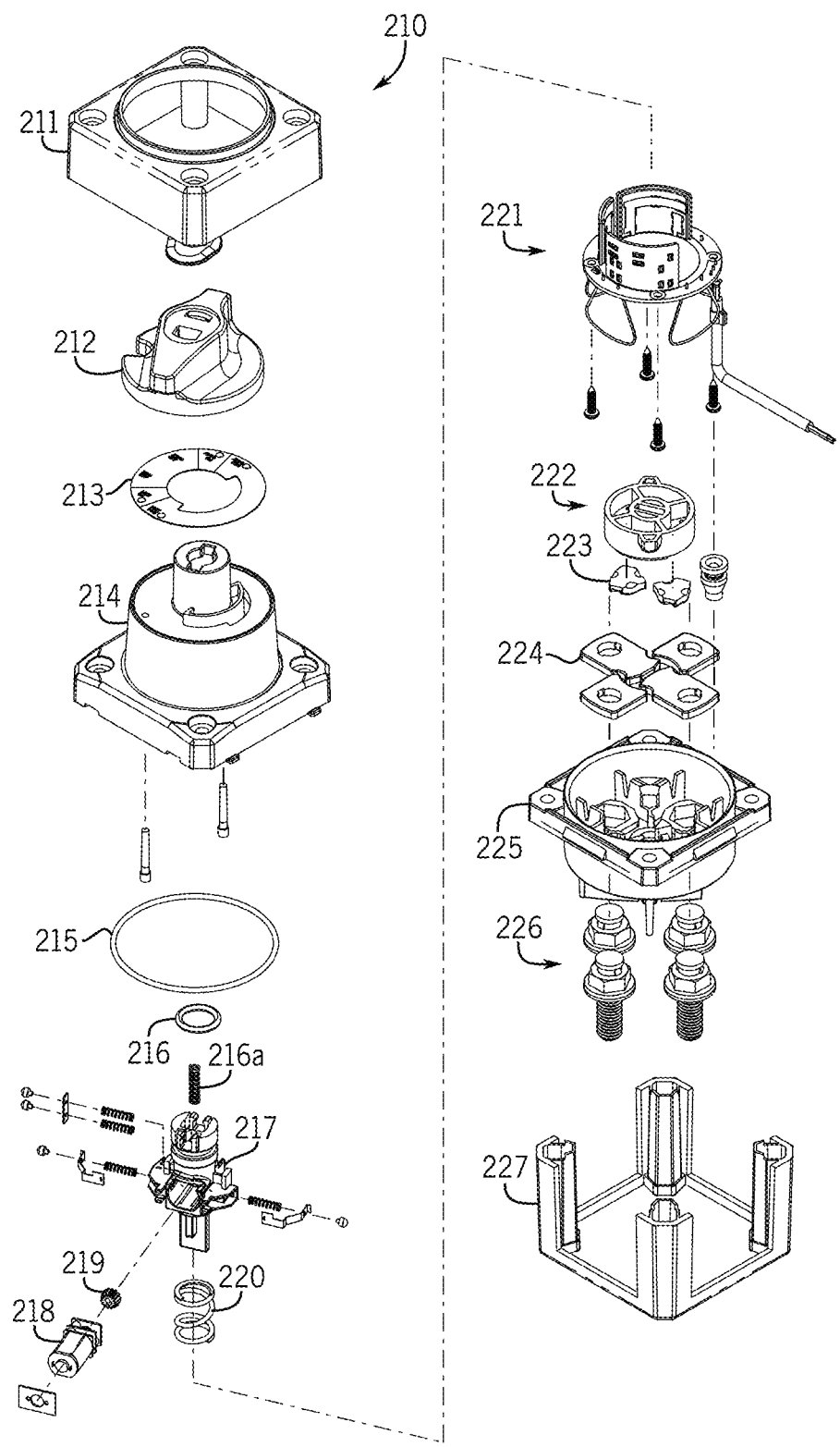
FIG. 19 shows an exploded view of an alternant embodiment of the rotary switch of the present invention.

FIG. 19 shows an exploded view of an alternant embodiment 210 of the rotary switch 100. FIG. 19 shows key parts of the motorized rotary switch 210. The key parts of the motorized rotary switch 210 include a mounting cover 211, a switch nob 212, a switch label 213, a switch cover 214, a switch cover O-ring 215, a switch cover seal 216, a switch nob spring 216a, a rotor rotator 217, a servo motor 218, a motor gear 219, a spring 220, a printed circuit board 221, a rotor 222, bus plate connectors 223, bus plates 224, and a switch base 225.

Figure 20:
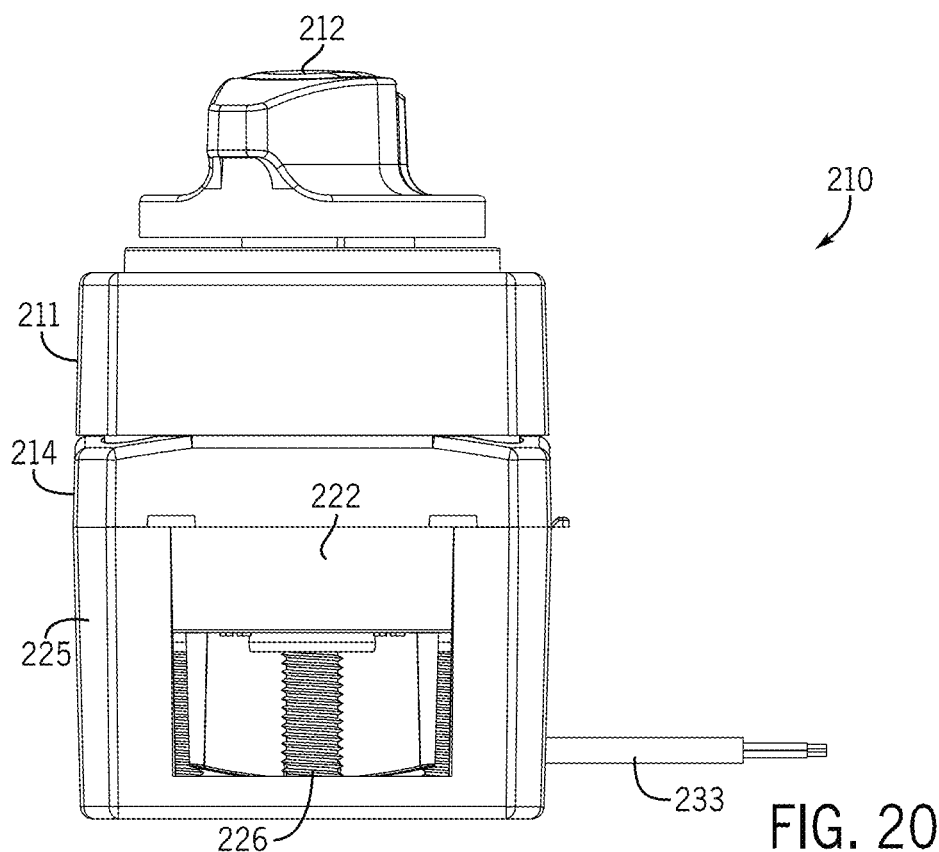
FIG. 20 is a perspective view of the battery switch of the alternant embodiment.
Figure 21:
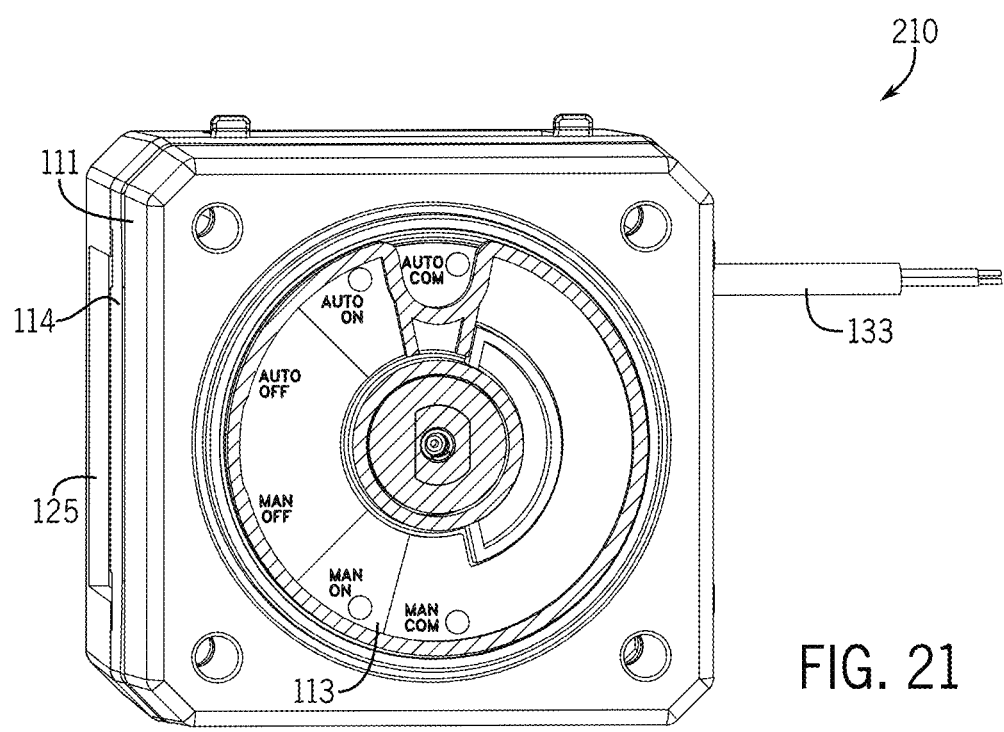
FIG. 21 is a top view of the battery switch of the alternant embodiment.

FIG. 20 shows the switch 210 in an assembled configuration. FIG. 20 further shows electrical wires that connect to a remote controller of the switch 210. FIG. 21 show a top of the switch further showing the switch label 213. In the off positions there is no electrical current to the engine or to the house. In the "on" positions electrical current goes from a house battery to house appliances and electrical current goes from an engine battery to an engine. In the "com" positions electrical current goes from both batteries to both the house appliances and the engine The switch 210 can operate in an automatic mode with a remote controller or manually.

Figure 22:
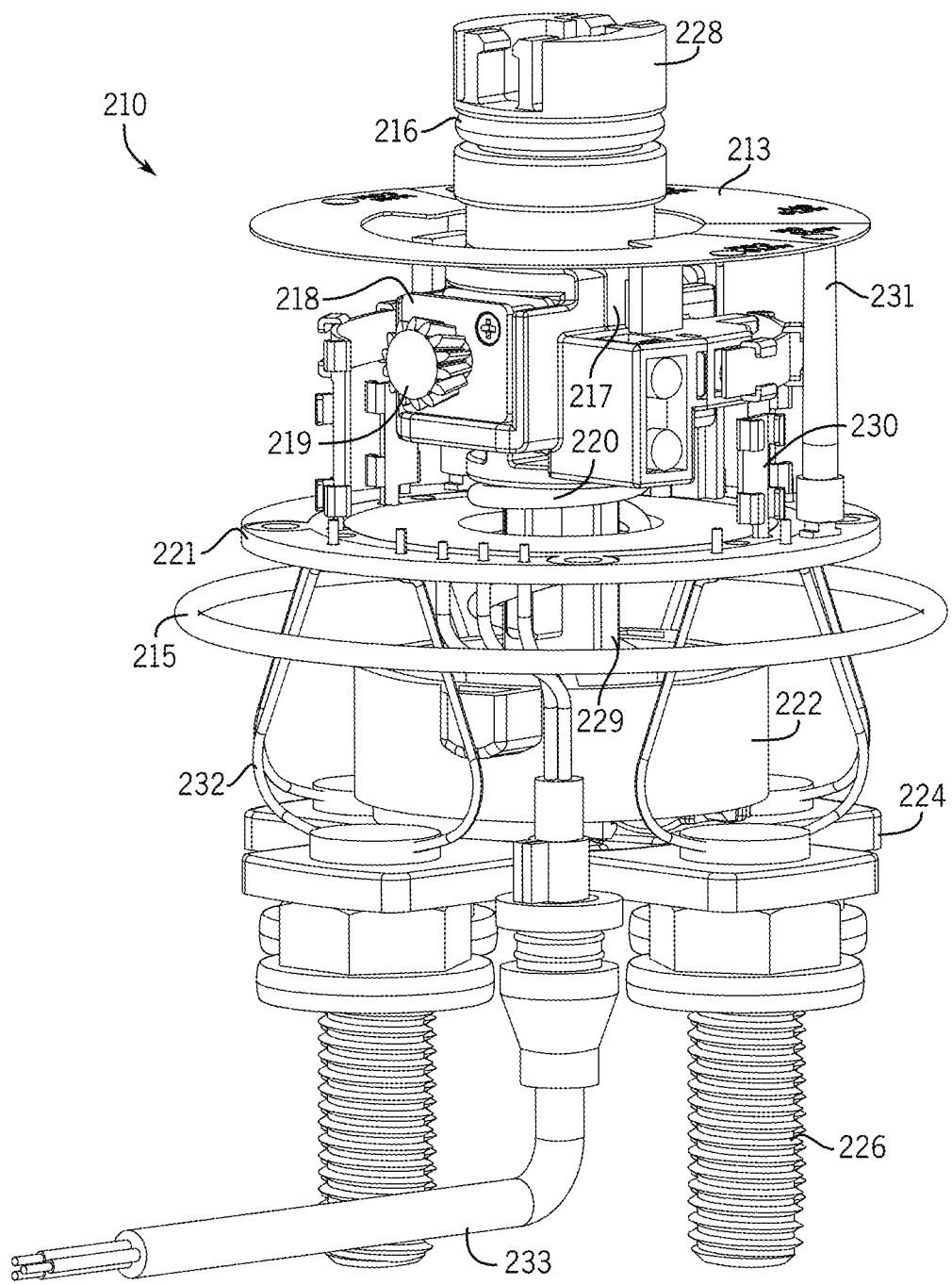
FIG. 22 shows a perspective view of the rotor rotator and the rotor of the alternant embodiment.
Figure 23:
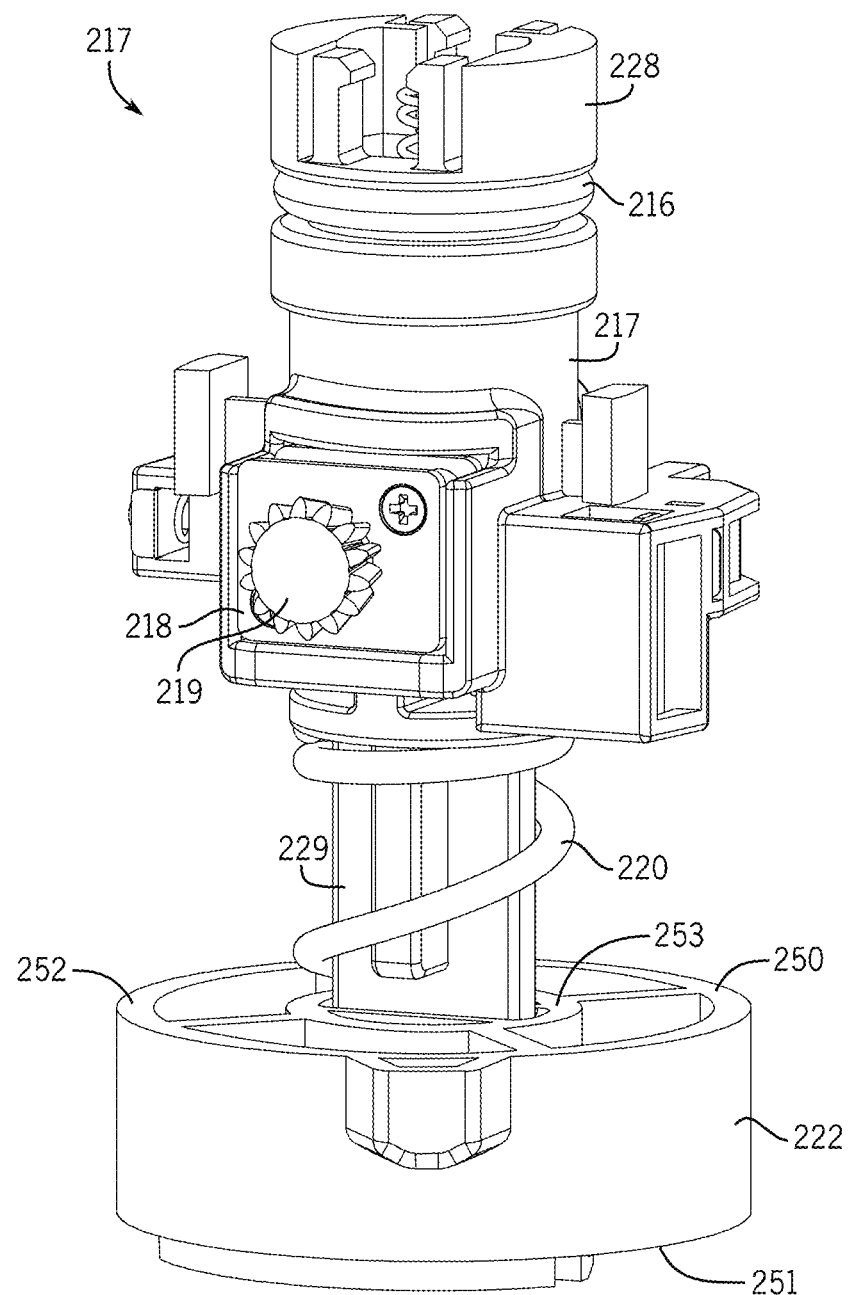
FIG. 23 shows an enlarged perspective view of the rotor rotator.

FIG. 22 shows a perspective view of the rotor rotator 217 and the rotor 222. The rotor rotator 217 has a servo motor 218 in a middle portion of the rotor rotator 217 that operates a motor gear 219. A top end of the rotor rotator 217 has a switch nob connector 228 which connects the switch nob 212 to the rotor rotator 217. A bottom end of the rotor rotator 217 has a rotor key shaft 229 which allows the rotor rotator 217 to rotate the rotor 222. The rotor key shaft 229 inserts into the rotor 222. A printed circuit board 221 is positioned around the rotor key shaft 229. The printed circuit board 221 has a processor and memory and is programmable. The printed circuit board (PCB) 221 powers the servo motor 218. An electrically conducting spring 232 is attached to each electrical connector 226 and provides electrical current to the circuit board 221. Electrical current is provided to the servo motor 217 through connectors 230. The electrical connectors 226 are voltage sensitive producing a voltage sensitive switch 210 through the PCB 221. Light pipes 231 provide light to the switch label 213. Electrical wires 233 are connected to the PCB from a remote controller 241 (See FIG. 27). The remote controller 241 operates the switch 210 when the switch 210 is positioned in the auto mode by turning the switch nob 212 out of the manual position. An enlarged view of the rotator rotor 217 is shown in FIG. 23. The rotor 222 functions similarly to the rotor 110 shown in FIGS. 1, 11-13, 16A-C, and 17. The rotor 222 has a top surface 250 and a bottom surface 251, with a key insert opening 253 on the top surface 252 to receive the rotor key shaft 229. The bus plate connectors 223 may or may not make any electrical connection with the bus plates 224 when the switch nob 212 is in an off position.

Figure 24:
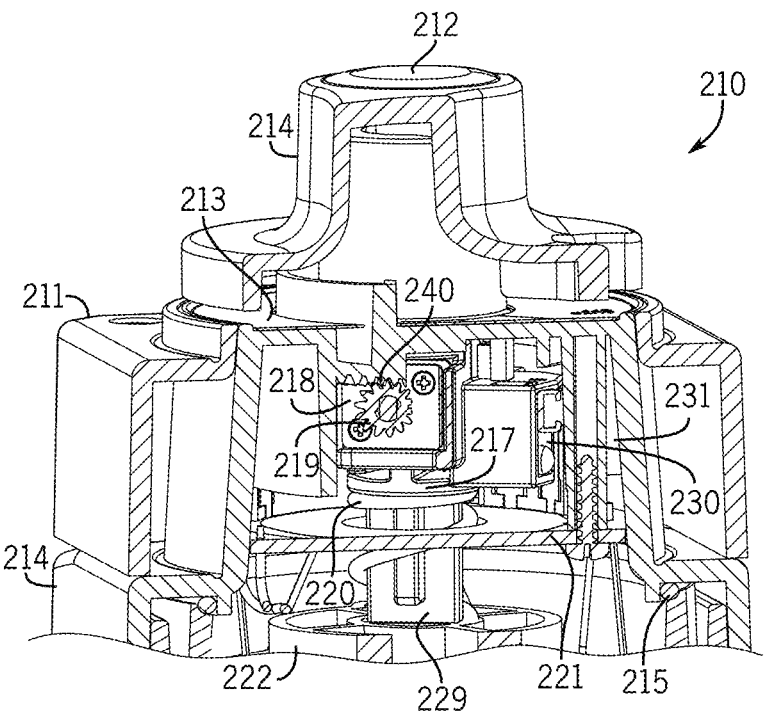
FIG. 24 shows a perspective cutaway view of the battery switch of the alternant embodiment in an auto motor driven mode.
Figure 25:
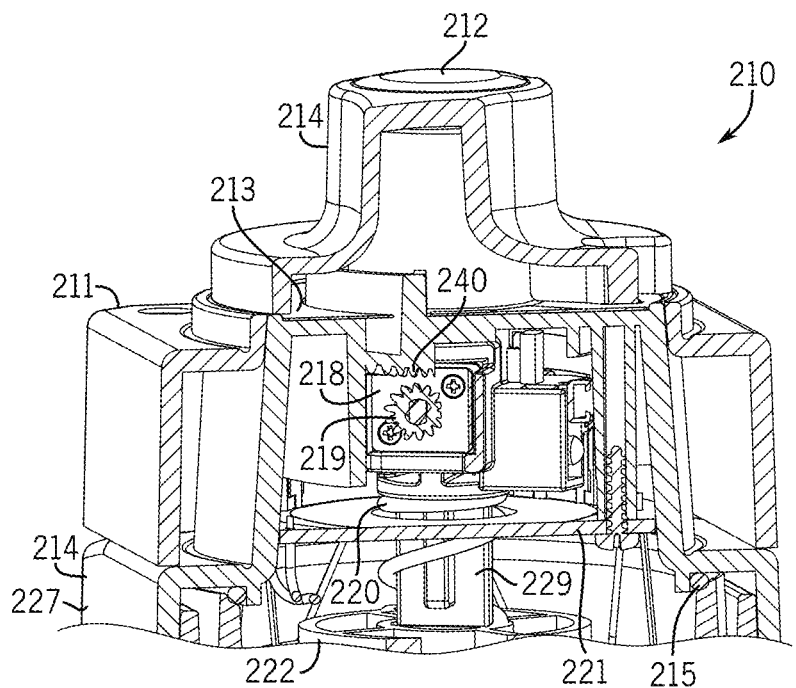
FIG. 25 shows a perspective cutaway view of the rotor rotator of the alternant embodiment in a manual mode.

FIG. 24 shows a perspective cutaway view of the switch 210 in an auto motor driven mode. The motor gear 219 engages an inner gear 240 of the switch cover 214. When the servo motor 218 rotates the motor gear 219 the rotor rotator 217 rotates the rotor 222 which changes the electric connections of the electrical connectors 226. FIG. 25 shows a perspective cutaway view of the switch 210 in a manual mode. Spring 220 biases the rotor rotator 217 upward to place the motor gear 219 into the inner gear 240 of the switch cover 214. The switch nob 212 can be pushed downward causing the servo motor gear 219 to disengage from the inner gear 240. The switch nob 212 can then be rotated manually.

Figure 26:
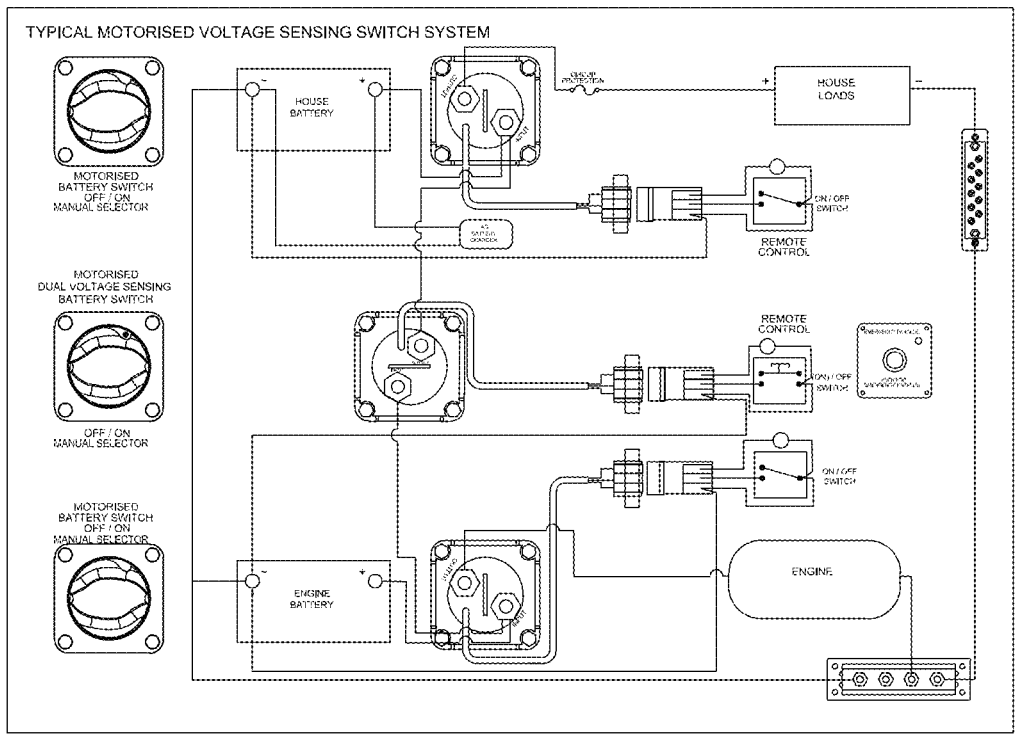
FIG. 26 is an electrical diagram of the switching function of a prior art motorized voltage sensing switch.

FIG. 26 is an electrical diagram of the switching function of a prior art motorized voltage sensing switch. Two-pole switches are disclosed. There is one switch for the house battery, a second switch for the engine battery, and a third switch for the motor. The configuration of this switch is complex and relative costly to manufacture. Having to operate three switches is not as convenient as having to operate only a single switch.

Figure 27:
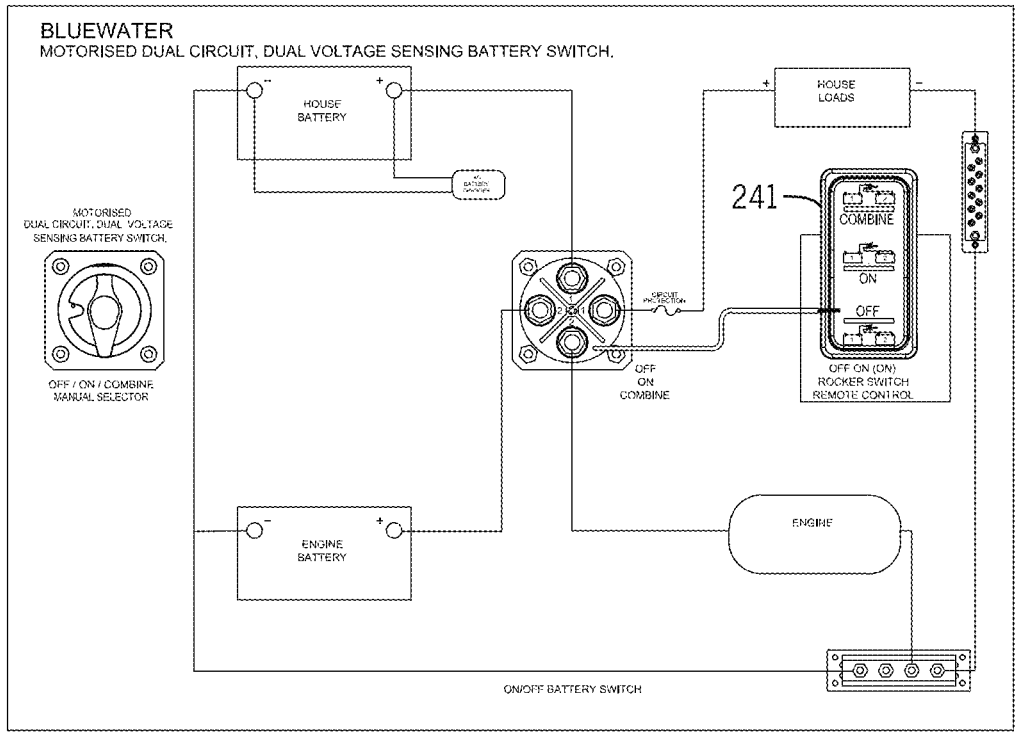
FIG. 27 is an electrical diagram of the switching function of the motorized dual circuit, dual voltage sensing battery switch of the alternant embodiment.
Figure 29:
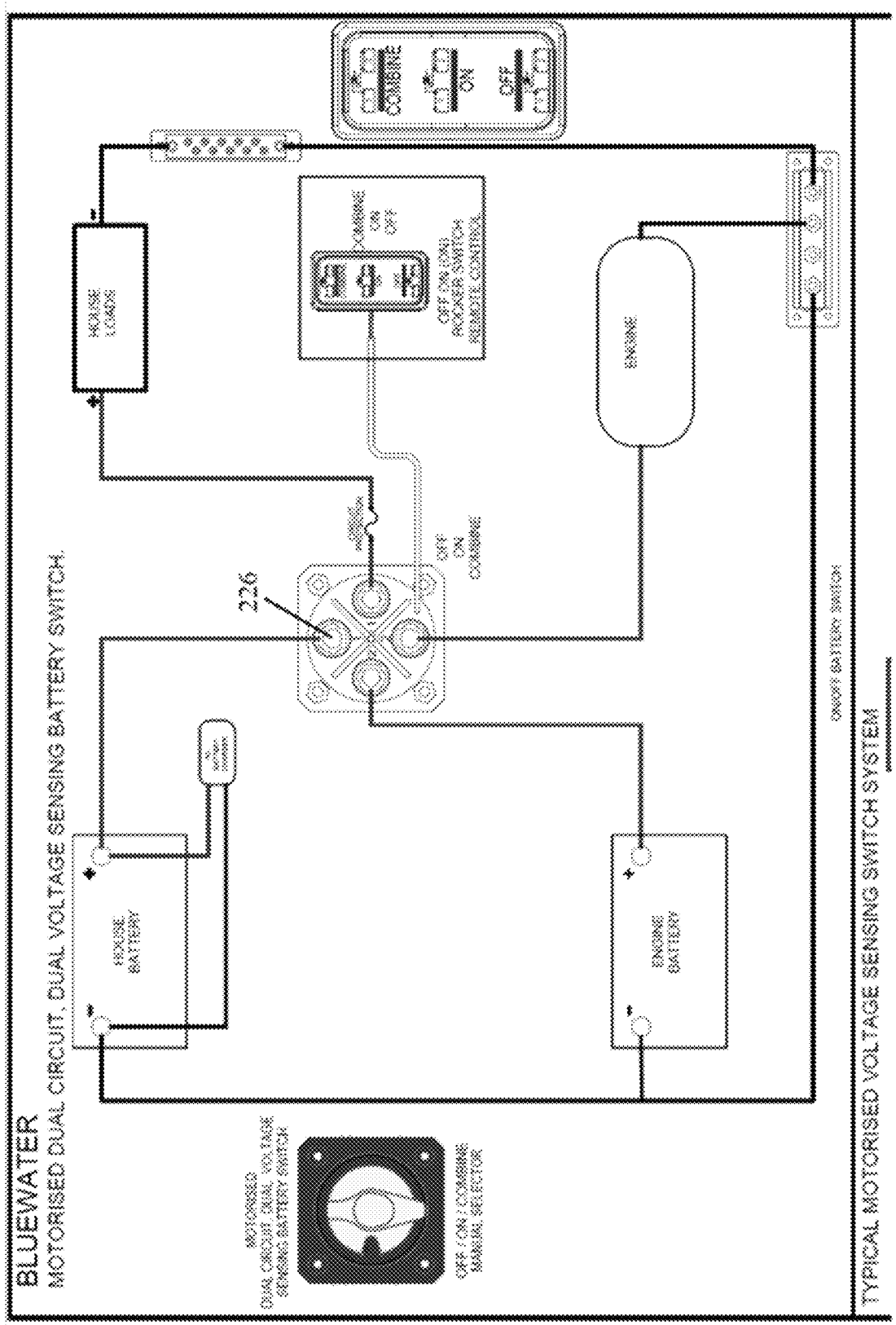
FIG. 29 is an enlarged view of FIG. 27.

FIG. 27 is an electrical diagram of the switching function of the motorized dual circuit, dual voltage sensing battery switch 210 of the present invention. The switch has 4 poles 226, one pole for the house battery, one pole for house, one pole for the engine battery, and one pole for the engine. The ability to configure four poles 226 into one switch 210 provides numerous benefits. The prior art format of having two battery switches and one voltage sensitive relay is replaced with a single all in one battery switch. Not only does the battery switch 210 provide cost savings but labor savings as well. In addition, the installation of the battery switch 210 requires significantly less cable and saves panel space, considering that space for two battery switches and a voltage sensitive relay is no longer needed. It is projected that overall cost savings of the battery switch 210, compared to prior art switches, would be over 200%. FIG. 29 is an enlarged view of FIG. 27.

Figure 28A:
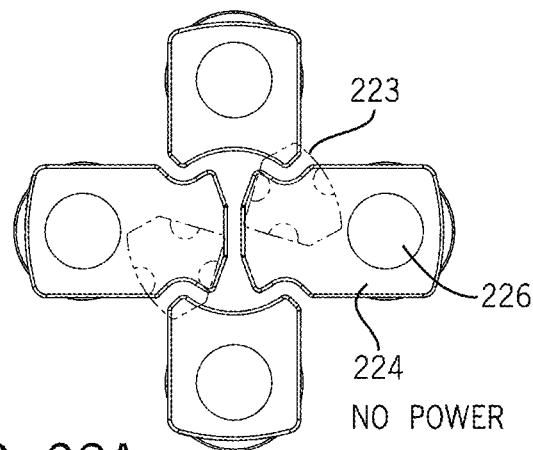
FIG. 28A shows the configuration of the bus plate connectors on the bus plates when the switch is off.
Figure 28B:
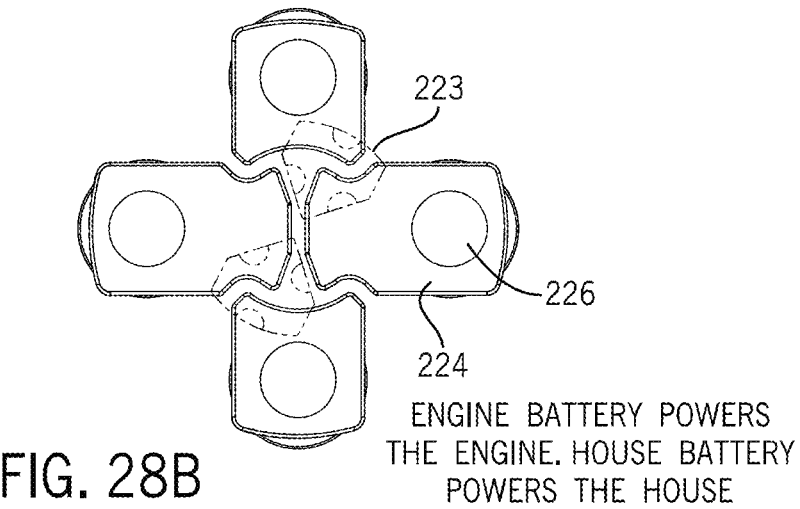
Figure 28C:
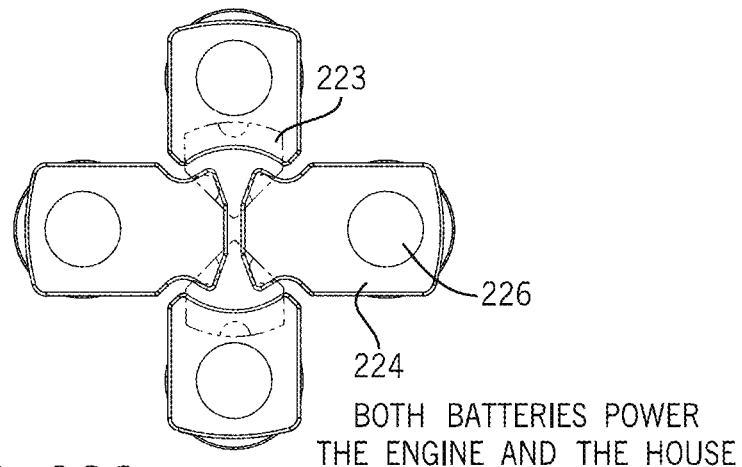
FIG. 28C shows the configuration of the bus plate connectors on the bus plates when the switch is in the combine on position.

FIG. 28A shows the configuration of the bus plate connectors 223 on the bus plates 224 when the battery switch 210 is off. In this configuration the bus plate connectors 223 do not connect any of the bus plates 224 and poles 226 together. FIG. 28B shows the configuration of the bus plate connectors 223 on the bus plates when the battery switch 210 is on. Two adjacent bus plates 224 and poles 226 are connected and two opposite adjacent bus plates 224 and poles 226 are connected. FIG. 28C shows the configuration of the bus plate connectors 223 on the bus plates 224 when the battery switch 210 is in the combine on position. All bus plates 224 and poles 226 are connected together.

Although the rotor rotator and rotor have been described as making connections in a rotary switch having four electrical terminals, the rotor rotator and rotor will also work with a rotary switch having two terminals (a two-position switch) or three terminals (a three-position switch) by simply limiting the number of electrical terminals in the rotary switch and/or by limiting the number of bus plate connectors.

The foregoing description illustrates and describes the disclosure. Additionally, the disclosure shows and describes only the preferred embodiments but, as mentioned above, it is to be understood that the preferred embodiments are capable of being formed in various other combinations, modifications, and environments and are capable of changes or modifications within the scope of the invention concepts as expressed herein, commensurate with the above teachings and/or the skill or knowledge of the relevant art. The embodiments described herein above are further intended to explain the best modes known by applicant and to enable others skilled in the art to utilize the disclosure in such, or other, embodiments and with the various modifications required by the particular applications or uses thereof. Accordingly, the description is not intended to limit the invention to the form disclosed herein. Also, it is intended that the appended claims be construed to include alternative embodiments. It will be further understood that various changes in the details, materials, and arrangements of the parts which have been described and illustrated above in order to explain the nature of this invention may be made by those skilled in the art without departing from the principle and scope of the invention as recited in the following claim.

The invention claimed is:

1. A rotor rotator and rotor system for a multi-pole electrical rotary battery switch, comprising:
   a) a rotor having a top surface and a bottom surface with a key insert opening on the top surface;
   b) one or two bus plate connectors held in chambers on the bottom surface of the rotor;
   c) a rotor rotator having a servo motor with a motor gear in the rotor rotator, a switch nob connector at a top end of the rotor rotator, and a rotor key shaft at a bottom end of the rotor rotator which inserts into the key insert opening of the rotor;
   d) the rotor rotator positioned in a switch cover, the switch cover having an inner gear engaging the motor gear, allowing the motor gear to rotate the rotor rotator; and
   e) a programmable printed circuit board with a processor and memory positioned around the rotor rotator and providing electrical current to the servo motor.

2. The rotor rotator and rotor system of claim 1, further comprising two to four bus plates connected to two to four electrical connector poles, wherein the two to four electrical connector poles provide electrical current to the printed circuit board by means of electrical conducting springs connected to the electrical connector poles and to the printed circuit board.

3. The rotor rotator and rotor system of claim 2, wherein the electrical conducting springs detect voltage changes for a voltage sensitive relay in the printed circuit board, forming a voltage sensitive relay battery charger.

4. The rotor rotator and rotor system of claim 2, further comprising the rotor connecting a first pair of electrical connector poles to a first battery and connecting a second pair of electrical connector poles to a second battery or connecting both pairs of electrical connector poles to each other by rotation of the rotor rotator.

5. The rotor rotator and rotor system of claim 1, wherein the multi-pole electrical rotary battery switch is in an automatic mode when the motor gear engages the inner gear and the printed circuit board rotates the rotor rotator automatically, and the multi-pole electrical rotary switch is in a manual mode when the rotor rotator is pushed downward, disengaging the motor gear and the inner gear, and the rotor rotator is rotated manually.

6. The rotor rotator and rotor system of claim 1, further comprising a remote controller connected electrically to the printed circuit board to operate the rotor rotator remotely in the automatic mode.

7. A rotor rotator and rotor system for a multi-pole electrical rotary battery switch, comprising:
   a) a rotor having a top surface and a bottom surface with a key insert opening on the top surface;
   b) one or two bus plate connectors held in chambers on the bottom surface of the rotor;
   c) a rotor rotator having a servo motor with a motor gear in a middle portion of the rotor rotator, a switch nob connector at a top end of the rotor rotator, and a rotor key shaft at a bottom end of the rotor rotator which inserts into the key insert opening of the rotor;
   d) the rotor rotator positioned in a switch cover, the switch cover having an inner gear engaging the motor gear, allowing the motor gear to rotate the rotor;
   e) a programmable printed circuit board with a processor and memory positioned around the rotor rotator and providing electrical current to the servo motor; and
   f) two to four bus plates connected to two to four electrical connector poles, wherein the two to four electrical connector poles provide electrical current to the printed circuit board by means of electrical conducting springs connected to the electrical connector poles and to the printed circuit board.

8. The rotor rotator and rotor system of claim 7, wherein the electrical conducting springs detect voltage changes for a voltage sensitive relay in the printed circuit board, forming a voltage sensitive relay battery charger.

9. The rotor rotator and rotor system of claim 7, further comprising the rotor connecting a first pair of electrical connector poles to a first battery and connecting a second pair of electrical connector poles to a second battery or connecting both pairs of electrical connector poles to each other by rotation of the rotor rotator.

10. The rotor rotator and rotor system of claim 7, wherein the multi-pole electrical rotary battery switch is in an automatic mode when the motor gear engages the inner gear and the printed circuit board rotates the rotor rotator automatically, and the multi-pole electrical rotary switch is in a manual mode when the rotor rotator is pushed downward, disengaging the motor gear and the inner gear, and the rotor rotator is rotated manually.

11. The rotor rotator and rotor system of claim 7, further comprising a remote controller connected electrically to the printed circuit board to operate the rotor rotator remotely in the automatic mode.

12. A rotor rotator and rotor system for a multi-pole electrical rotary battery switch, comprising:
   a) a rotor having a top surface and a bottom surface with a key insert opening on the top surface;
   b) one or two bus plate connectors held in chambers on the bottom surface of the rotor;
   c) a rotor rotator having a servo motor with a motor gear in a middle portion of the rotor rotator, a switch nob connector at a top end of the rotor rotator, and a rotor key shaft at a bottom end of the roto rotator that inserts into the key insert opening of the rotor;
   d) the rotor rotator positioned in a switch cover, the switch cover having an inner gear engaging the motor gear, allowing the motor gear to rotate the rotor;
   e) a programmable printed circuit board with a processor and memory positioned around the rotor rotator and providing electrical current to the servo motor;
   f) two to four bus plates connected to two to four electrical connector poles, wherein the two to four electrical connector poles provide electrical current to the printed circuit board by means of electrical conducting springs connected to the electrical connector poles and to the printed circuit board, wherein the electrical conducting springs detect voltage changes for a voltage sensitive relay in the printed circuit board, forming a voltage sensitive relay battery charger; and
   g) the rotor connecting a first pair of electrical connector poles to a first battery and connecting a second pair of electrical connector poles to a second battery or connecting both pairs of electrical connector poles to each other by rotation of the rotor rotator; and
   h) a remote controller connected electrically to the printed circuit board to operate the rotor rotator remotely in the automatic mode.

13. The rotor rotator and rotor system of claim 12, wherein the multi-pole electrical rotary battery switch is in an automatic mode when the motor gear engages the inner gear and the printed circuit board rotates the rotor rotator automatically, and the multi-pole electrical rotary switch is in a manual mode when the rotor rotator is pushed downward, disengaging the motor gear and the inner gear, and the rotor rotator is rotated manually.

* * * * *